US012619036B2

(12) United States Patent
Yu et al.

(10) Patent No.: US 12,619,036 B2
(45) Date of Patent: May 5, 2026

(54) OPTICAL MODULE

(71) Applicant: HISENSE BROADBAND MULTIMEDIA TECHNOLOGIES CO., LTD., Qingdao (CN)

(72) Inventors: Bangyu Yu, Qingdao (CN); Mengbo Fu, Qingdao (CN); Wei Cui, Qingdao (CN); Kai Liu, Qingdao (CN); Dan Li, Qingdao (CN); Yifan Xie, Qingdao (CN); Chuanbin Li, Qingdao (CN); Honghao Zhang, Qingdao (CN); Feng Cui, Qingdao (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 372 days.

(21) Appl. No.: 18/344,667

(22) Filed: Jun. 29, 2023

(65) Prior Publication Data

US 2023/0350137 A1 Nov. 2, 2023

Related U.S. Application Data

(63) Continuation of application No. PCT/CN2022/078060, filed on Feb. 25, 2022.

(30) Foreign Application Priority Data

| | | |
|---|---|---|
| Mar. 16, 2021 | (CN) ......................... | 202120545689.1 |
| Apr. 28, 2021 | (CN) ......................... | 202120923602.X |
| Apr. 28, 2021 | (CN) ......................... | 202120923836.4 |

(51) Int. Cl.
G02B 6/42 (2006.01)

(52) U.S. Cl.
CPC ........... G02B 6/4206 (2013.01); G02B 6/423 (2013.01)

(58) Field of Classification Search
CPC .. G02B 6/4246; G02B 6/4292; G02B 6/4204; G02B 6/421; G02B 6/428; G02B 6/4214; G02B 6/4271; G02B 6/42
See application file for complete search history.

(56) References Cited

U.S. PATENT DOCUMENTS

| | | |
|---|---|---|
| 2010/0200277 A1 | 8/2010 | Huang et al. |
| 2011/0075976 A1 | 3/2011 | Sutherland |

(Continued)

FOREIGN PATENT DOCUMENTS

| | | |
|---|---|---|
| CN | 102597835 A | 7/2012 |
| CN | 104284533 A | 1/2015 |

(Continued)

OTHER PUBLICATIONS

Wang et al., Machine Translation of CN 110708122 A, Jan. 17, 2020. (Year: 2020).*

(Continued)

*Primary Examiner* — Michelle R Connelly
(74) *Attorney, Agent, or Firm* — Cozen O'Connor

(57) ABSTRACT

An optical module includes a circuit board, a light-emitting housing, a first optical fiber adapter, a first internal optical fiber, and an optical fiber connector. An end of the first internal optical fiber is connected to the first optical fiber adapter, and the optical fiber connector is optically connected to the light-emitting component and wraps another end of the first internal optical fiber. The first internal optical fiber and the optical fiber connector are transparent material members, and light transmittance of the two is different. The light-emitting housing includes a bottom wall and a concave groove. The optical fiber connector is disposed on the bottom wall, and a portion of the optical fiber connector is located above the concave groove. An orthogonal projection (Continued)

of the another end of the first internal optical fiber on the bottom wall is located in the concave groove.

19 Claims, 16 Drawing Sheets

(56)                        References Cited

U.S. PATENT DOCUMENTS

2012/0076505  A1        3/2012   Azemati et al.
2020/0073052  A1*      3/2020   Lin ...................... G02B 6/4254

FOREIGN PATENT DOCUMENTS

CN              110708122  A   *   1/2020   ........... G02B 6/4269
CN              111913258  A        11/2020
CN              214278492  U          9/2021
CN              214704097  U        11/2021
CN              214704098  U        11/2021
JP              2019008105  A   *   1/2019   ............. H01S 5/024

OTHER PUBLICATIONS

Sato et al., Machine Translation of JP 2019-008105 A, Jan. 17, 2019. (Year: 2019).*
International Search Report and Written Opinion dated May 19, 2022 in corresponding International Application No. PCT/CN2022/078060, translated, 24 pages.

* cited by examiner

Left ←——→ Right

Left ← → Right

Left ← → Right

B 300    480

330

410

415    416    2201

225    220

210    2101

211

OPTICAL MODULE

CROSS-REFERENCE TO RELATED APPLICATIONS

This application is a continuation application of International Patent Application No. PCT/CN2022/078060, filed on Feb. 25, 2022, pending, which claims priority to Chinese Patent Application No. 202120545689.1, filed on Mar. 16, 2021, Chinese Patent Application No. 202120923602.X, filed on Apr. 28, 2021, and Chinese Patent Application No. 202120923836.4, filed on Apr. 28, 2021, which are incorporated herein by reference in their entireties.

TECHNICAL FIELD

The present disclosure relates to the field of optical communication technologies, and in particular, to an optical module.

BACKGROUND

With the development of new services and application scenarios such as cloud computing, mobile Internet, and video conferencing, development and progress of optical communication technologies have become increasingly important. In optical communication technology, an optical module is a tool for achieving interconversion between an optical signal and an electrical signal and is one of key devices in an optical communication equipment.

SUMMARY

An optical module is provided, and the optical module includes a shell, a circuit board, a light-emitting component, a first optical fiber adapter, a first internal optical fiber, and an optical fiber connector. The circuit board is disposed in the shell. The light-emitting component is disposed in the shell. The light-emitting component is electrically connected to the circuit board and configured to generate an optical signal. One end of the first internal optical fiber is connected to the first optical fiber adapter. The optical fiber connector is optically connected to the light-emitting component and wraps another end of the first internal optical fiber. The first internal optical fiber and the optical fiber connector are transparent material members, and light transmittance of the first internal optical fiber is different from light transmittance of the optical fiber connector. The light-emitting component includes a light-emitting housing. The light-emitting housing includes a bottom wall and a concave groove, the concave groove is disposed on the bottom wall, and the concave groove is recessed downward relative to the bottom wall. The optical fiber connector is disposed on the bottom wall, and a portion of the optical fiber connector is located above the concave groove. An orthogonal projection of the another end of the first internal optical fiber on the bottom wall is located in the concave groove.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams and are not limitations on an actual size of a product, an actual process of a method and an actual timing of a signal to which the embodiments of the present disclosure relate.

DETAILED DESCRIPTION

Figure 1:
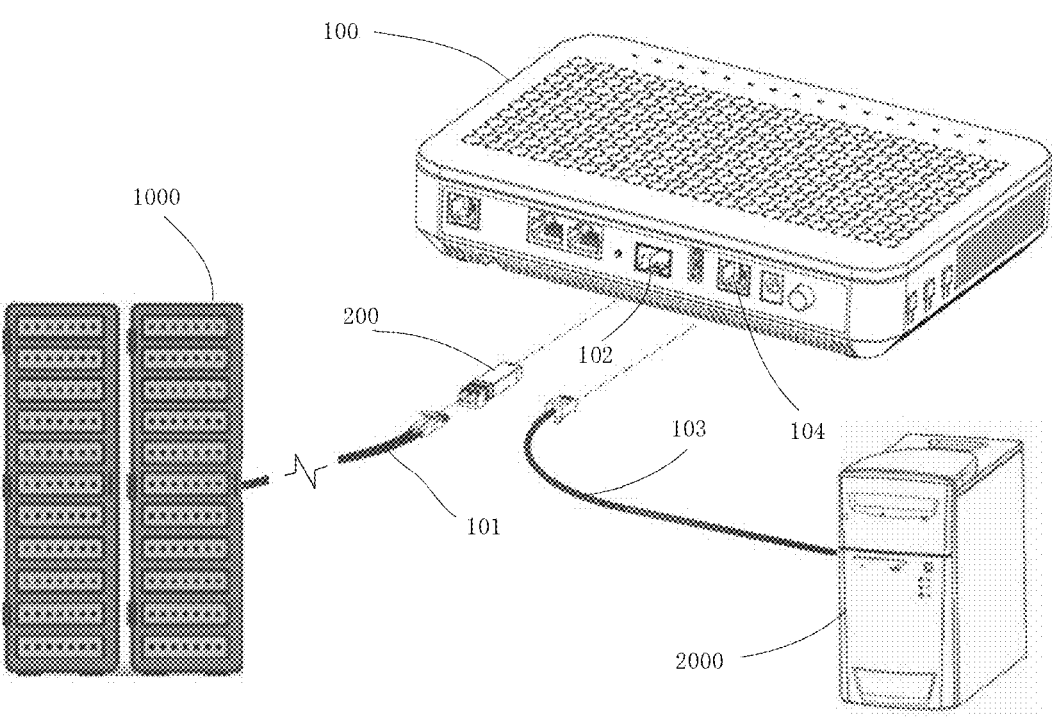
FIG. 1 is a diagram showing a partial structure of an optical communication system, in accordance with some embodiments.

The embodiments of the present disclosure will be described clearly and completely with reference to the accompanying drawings; however, the described embodiments are merely some but not all embodiments of the present disclosure. All other embodiments obtained by a person of ordinary skill in the art based on embodiments in the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics described herein may be included in any one or more embodiments or examples in any suitable manner.

Hereinafter, the terms "first" and "second" are only used for descriptive purposes and cannot be construed as indicating or implying the relative importance or implicitly indicating the number of indicated technical features. Therefore, the features defined with "first" and "second" may explicitly or implicitly include one or more of these features. In the description of the embodiments of the present disclosure, the terms "a plurality of" and "the plurality of" each mean two or more unless otherwise specified.

In the description of some embodiments, the term "connected" and its derivatives may be used. The term "connected" should be understood in a broad sense; for example, "connected" may represent a fixed connection, a detachable connection, or connected as an integral body; "connected" may be directly "connected" or indirectly "connected" through an intermediate means.

The phrase "at least one of A, B, and C" has the same meaning as the phrase "at least one of A, B, or C", and they both include the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

The use of the phrase "applicable to" or "configured to" herein means an open and inclusive expression, which does not exclude devices that are applicable to or configured to perform additional tasks or steps.

The term "about," "substantially," and "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

As used herein, "parallel," "perpendicular," and "equal" include the stated conditions and the conditions similar to the stated conditions, and the range of the similar conditions is within the acceptable deviation range, where the acceptable deviation range is determined by a person of ordinary skill in the art in consideration of the measurement in question and the error associated with the measurement of a specific quantity (i.e., the limitation of the measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of the approximate equality may be, for example, a difference between two equals of less than or equal to 5% of either of the two equals.

In the optical communication technology, in order to establish information transmission between information processing devices, it is necessary to load information into the light, and use the propagation of the light to realize information transmission. Here, the light loaded with information is an optical signal. When the optical signal is transmitted in an information transmission device, the loss of optical power can be reduced; thus, the high-speed, long-distance, and low-cost information transmission can be realized. A signal that the information processing device can recognize and process is an electrical signal. Information processing device usually includes optical network units (ONU), gateways, routers, switches, mobile phones, computers, servers, tablet computers, and TVs. The information transmission device usually includes optical fibers and optical waveguides.

The optical module can realize mutual conversion of optical signals and electrical signals between the information processing equipment and the information transmission equipment. For example, at least one of an optical signal input end or an optical signal output end of the optical module is connected to an optical fiber, and at least one of an electrical signal input end or an electrical signal output end of the optical module is connected to an optical network unit. A first optical signal from the optical fiber is transmitted to the optical module, and the optical module converts the first optical signal into a first electrical signal and transmits the first electrical signal to the optical network unit. A second electrical signal from the optical network unit is transmitted to the optical module, and the optical module converts the second electrical signal into a second optical signal and transmits the second optical signal to the optical fiber. Since information can be transmitted between a plurality of information processing equipments through electrical signals, at least one of the plurality of information processing equipments is required to be directly connected to the optical module, without all the information processing equipments being directly connected to the optical module. Here, the information processing equipment directly connected to the optical module is called a master monitor of the optical module. In addition, the optical signal input end or the optical signal output end of the optical module may be called an optical port, and the electrical signal input end or the electrical signal output end of the optical module may be called an electrical port.

FIG. 1 is a diagram showing a partial structure of an optical communication system, in accordance with some embodiments. As shown in FIG. 1, the optical communication system mainly includes a remote information processing device 1000, a local information processing device 2000, a master monitor 100, an optical module 200, an external optical fiber 101, and a network cable 103.

One end of the external optical fiber 101 extends toward the remote information processing device 1000, and the other end of the external optical fiber 101 is connected to the optical module 200 through the optical port of the optical module 200. The optical signal can be totally reflected in the external optical fiber 101, and the propagation of the optical signal in the direction of the total reflection may almost maintain an original optical power. The optical signal undergoes multiple total reflections in the external optical fiber 101, so that the optical signal from the remote information processing device 1000 is transmitted to the optical module 200, or the optical signal from the optical module 200 is transmitted to the remote information processing device 1000, so as to realize the information transmission with long-distance and low power consumption.

The optical communication system may include one or more external optical fibers 101, and the external optical fibers 101 are detachably connected to the optical module 200. Alternatively, the external optical fibers 101 are fixedly connected to the optical module 200. The master monitor 100 is configured to provide data signals to the optical module 200, receive data signals from the optical module 200, or monitor or control the working status of the optical module 200.

The master monitor 100 includes a housing in a substantially cuboid shape, and an optical module interface 102 disposed in the housing. The optical module interface 102 is configured to connect to the optical module 200, so that one-way electrical signal connection or bidirectional electrical signal connection between the master monitor 100 and the optical module 200 is established.

The master monitor 100 also includes an external electrical interface, the external electrical interface may be connected to an electrical signal network. For example, the external electrical interface includes a universal serial bus (USB) interface or a network cable interface 104, and the network cable interface 104 is configured to connect to the network cable 103, so that the one-way electrical signal connection and the bidirectional electrical signal connection between the master monitor 100 and the network cable 103 are established. One end of the network cable 103 is connected to a local information processing device 2000, and the other end of the network cable 103 is connected to the master monitor 100, so as to establish an electrical signal connection between the local information processing device 2000 and the master monitor 100 through the network cable 103. For example, a third electrical signal sent by the local information processing device 2000 is transmitted to the master monitor 100 through the network cable 103, and the master monitor 100 generates a second electrical signal according to the third electrical signal; the second electrical signal from the master monitor 100 is transmitted to the optical module 200, the optical module 200 converts the second electrical signal into a second optical signal, and transmits the second optical signal to the external optical fiber 101; and the second optical signal is transmitted to the remote information processing device 1000 in the external optical fiber 101. For example, the first optical signal from the remote information processing device 1000 propagates through the external optical fiber 101; the first optical signal from the external optical fiber 101 is transmitted to the optical module 200; the optical module 200 converts the first optical signal into a first electrical signal and transmits the first electrical signal to the master monitor 100; and the master monitor 100 generates a fourth electrical signal according to the first electrical signal, and transmits the fourth electrical signal to the local information processing device 2000. It will be noted that the optical module is a tool to realize the interconversion of the optical signal and the electrical signal. During the conversion process of the above optical signal and electrical signal, the information does not change, and the encoding and decoding methods of information may change.

In addition to the optical network unit, the master monitor 100 further includes an optical line terminal (OLT), an optical network terminal (ONT), or a data center server.

Figure 2:
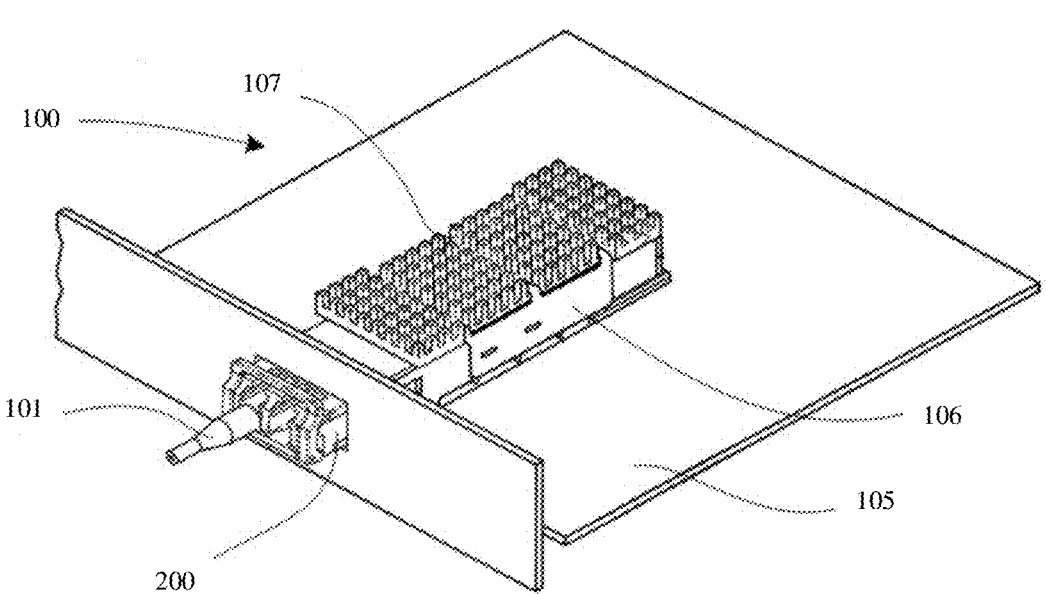
FIG. 2 is a local diagram showing a structure of a master monitor, in accordance with some embodiments.

FIG. 2 is a local diagram showing a structure of a master monitor, in accordance with some embodiments. In order to clearly show a connection relationship between the optical module 200 and the master monitor 100, FIG. 2 only shows structures of the master monitor 100 that are related to the optical module 200. As shown in FIG. 2, the master monitor 100 further includes a PCB circuit board 105 disposed in the housing, a cage 106 disposed on a surface of the PCB circuit board 105, a heat sink 107 disposed on the cage 106, and an electrical connector disposed inside the cage 106. The electrical connector is configured to connect the electrical port of the optical module 200, and the heat sink 107 has protruding structures such as fins for increasing a heat dissipation area.

The optical module 200 is inserted into the cage 106 of the master monitor 100, and the optical module 200 is fixed by the cage 106. Heat generated by the optical module 200 is conducted to the cage 106, and then is dissipated through the heat sink 107. After the optical module 200 is inserted into the cage 106, the electrical port of the optical module 200 is connected to the electrical connector inside the cage 106, so that the bidirectional electrical signal connection is established between the optical module 200 and the master monitor 100. In addition, the optical port of the optical module 200 is connected to the external optical fiber 101, so that a bidirectional optical signal connection is established between the optical module 200 and the external optical fiber 101.

Figure 3:
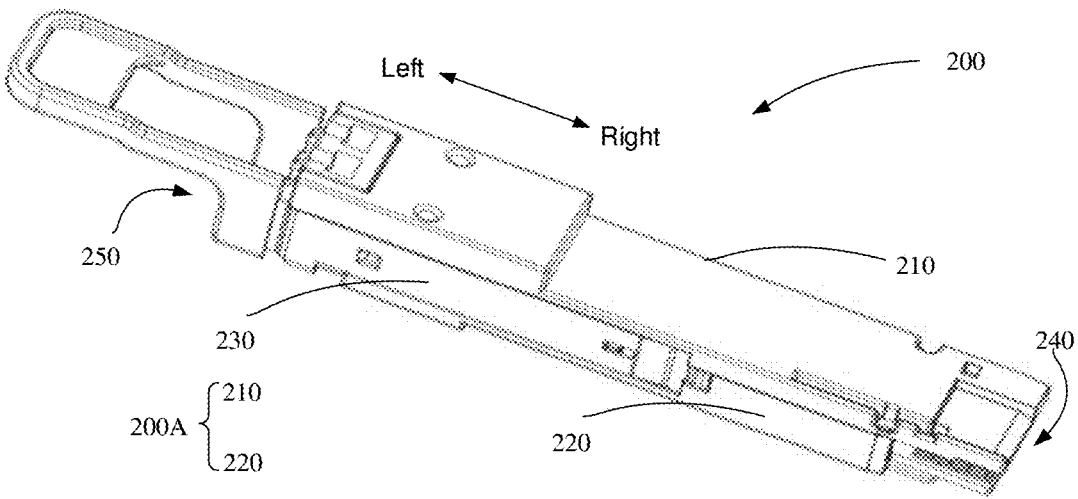
FIG. 3 is a structural diagram of an optical module, in accordance with some embodiments.
Figure 4:
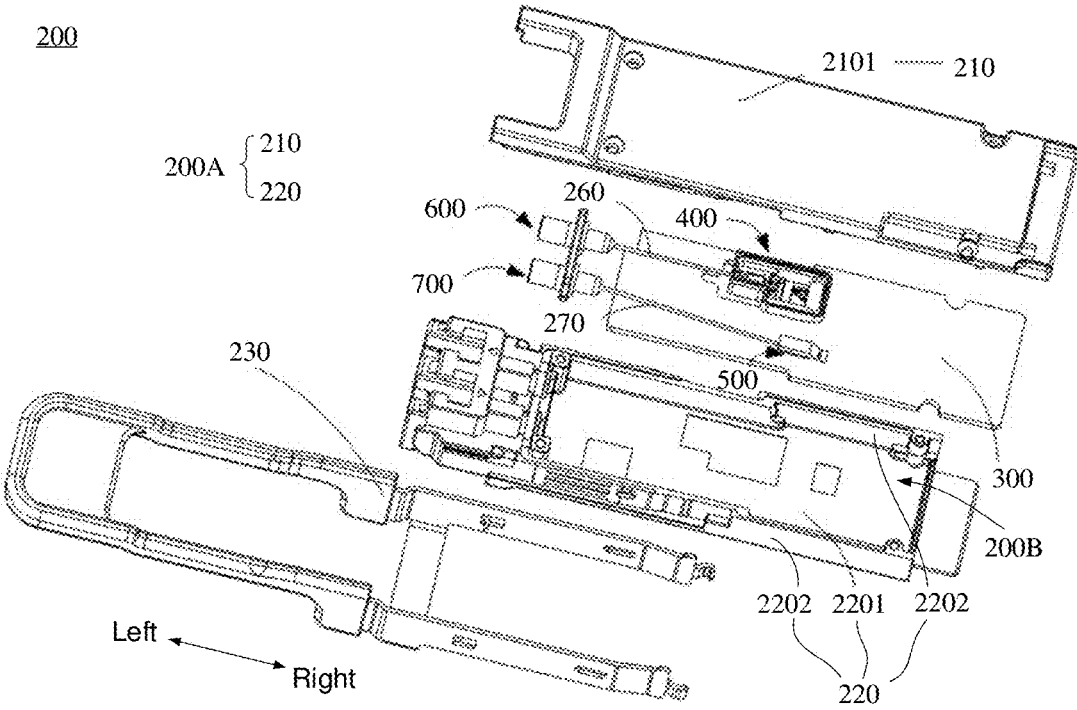
FIG. 4 is an exploded view of an optical module, in accordance with some embodiments.

FIG. 3 is a structural diagram of an optical module, in accordance with some embodiments, and FIG. 4 is an exploded view of an optical module, in accordance with some embodiments. As shown in FIGS. 3 and 4, the optical module 200 includes an optical module shell 200A (i.e., a shell), and a circuit board 300, a light-emitting component 400, and a light-receiving component 500 that are disposed inside the optical module shell 200A. However, the present disclosure is not limited thereto. In some embodiments, the optical module 200 includes one of the light-emitting component 400 and the light-receiving component 500.

The optical module shell 200A includes an upper shell 210 and a lower shell 220. The upper shell 210 is covered on the lower shell 220 to form the shell having two openings 240 and 250, and an outer contour of the shell is generally in a cuboid shape.

In some embodiments, the lower shell 220 includes a bottom plate 2201 and two lower side plates 2202 that are located on two sides of the bottom plate 2201 and disposed perpendicular to the bottom plate 2201; the upper shell 210 includes a cover plate 2101, and the cover plate 2101 covers the two lower side plates 2202 of the lower shell 220 to form the shell.

In some embodiments, the lower shell 220 includes a bottom plate 2201 and two lower side plates 2202 located on both sides of the bottom plate 2201 respectively and disposed perpendicular to the bottom plate 2201; the upper shell 210 may include a cover plate 2101 and two upper side plates located on both sides of the cover plate 2101 respectively and disposed perpendicular to the cover plate 2101; and the two upper side plates are combined with the two lower side plates 2202 respectively, so that the upper shell 210 covers the lower shell 220.

A direction in which a connecting line between two openings 240 and 250 is located may be the same as a longitudinal direction of the optical module 200 or may not be the same as the longitudinal direction of the optical module 200. For example, the opening 240 is located at an end (a right end in FIG. 3) of the optical module 200, and the opening 250 is also located at an end (a left end in FIG. 3) of the optical module 200. Alternatively, the opening 240 is located at an end of the optical module 200, and the opening 250 is located at a side of the optical module 200. The opening 240 is the electrical port, and a connecting finger of the circuit board 300 extends from the electrical port 240 and is inserted into an electrical connector of the master monitor 100; the opening 250 is the optical port, which is configured to access the external optical fiber 101, so that the external optical fiber 101 is connected to the light-emitting component 400 and the light-receiving component 500 in the optical module 200.

By adopting an assembly mode of combining the upper shell 210 and the lower shell 220, it may be easy to install the circuit board 300, the light-emitting component 400, and the light-receiving component 500 into the optical module shell 200A, and the upper shell 210 and the lower shell 220 may provide sealing and protection for these devices. In addition, when assembling the circuit board 300, the light-emitting component 400, and the light-receiving component 500, it may be easy to arrange the positioning components, heat dissipation components, and electromagnetic shielding components of these devices, which facilitates automated production.

In some embodiments, the upper shell 210 covers the lower shell 220 to define an installation cavity between the upper shell 210 and the lower shell 220. The circuit board 300 and the light-emitting component 400 are disposed in the installation cavity.

In some embodiments, the upper shell 210 and the lower shell 220 are made of a metal material, which is conducive to electromagnetic shielding and heat dissipation.

In some embodiments, the optical module 200 further includes an unlocking component 230 located outside the shell. The unlocking component 230 is configured to implement a fixed connection between the optical module 200 and the master monitor, or to release the fixed connection between the optical module 200 and the master monitor.

For example, the unlocking component 230 is located outside the two lower side plates 2202 of the lower shell 220 and includes an engagement portion that is matched with the cage 106 of the master monitor 100. When the optical module 200 is inserted into the cage 106, the optical module 200 is fixed in the cage 106 by the engagement portion of the unlocking component 230. When the unlocking component 230 is pulled, the engagement portion of the unlocking component 230 moves along with the unlocking component 230, and then a connection relationship between the engagement portion and the master monitor is changed, so as to release the fixation between the optical module 200 and the master monitor, so that the optical module 200 may be pulled out of the cage 106.

The circuit board 300 includes circuit wirings, electronic elements, and chips, and the electronic element and the chip are connected according to a circuit design through the circuit wiring, so as to implement functions such as power supply, transmission of an electrical signal, and grounding. The electronic elements may include, for example, a capacitor, a resistor, a triode, and a metal-oxide-semiconductor field-effect transistor (MOSFET). The chips may include, for example, a microcontroller unit (MCU), a laser driving chip, a transimpedance amplifier (TIA), a limiting amplifier, a clock and data recovery (CDR) chip, a power management chip, or a digital signal processing (DSP) chip.

The circuit board 300 is generally a rigid circuit board. Due to the relatively hard material of the rigid circuit board, the rigid circuit board can also achieve bearing effects. For example, the rigid circuit board may stably bear the electronic elements and the chips, and the rigid circuit board may also be inserted into the electrical connector in the cage 106 of the master monitor 100.

The circuit board 300 further includes the connecting finger formed on an end surface thereof, and the connecting finger is composed of a plurality of independent pins. The circuit board 300 is inserted into the cage 106, and the circuit board 300 is conducted with the electrical connector in the cage 106 through the connecting finger. The connecting finger may be disposed on only one surface of the circuit board 300. Alternatively, the connecting finger may also be disposed on both upper and lower surfaces of the circuit board 300 to provide a larger number of pins, so as to adapt to an occasion where a large number of pins are needed. The connecting finger is configured to establish electrical connection with the master monitor, so as to implement power supply, grounding, inter-integrated circuit (I2C) signal transmission, and data signal transmission. Of course, flexible circuit boards are also used in some optical modules. A flexible circuit board is generally used in conjunction with the rigid circuit board as a supplement to the rigid circuit board.

At least one of the light-emitting component 400 or the light-receiving component 500 is located on a side of the circuit board 300 away from the connecting finger.

In some other embodiments, the light-emitting component 400 and the light-receiving component 500 are physically separated from the circuit board 300, respectively, and are each electrically connected to the circuit board 300 through the corresponding flexible circuit board or electrical connecting member, respectively.

In some embodiments, at least one of the light-emitting component 400 or the light-receiving component 500 may be directly disposed on the circuit board 300. For example, at least one of the light-emitting component 400 or the light-receiving component 500 may be disposed on a surface of the circuit board 300 or the side of the circuit board 300.

In some embodiments, as shown in FIG. 4, the optical module 200 further includes a first optical fiber adapter 600, a second optical fiber adapter 700, a first internal optical fiber 260, and a second internal optical fiber 270. The light-emitting component 400 is connected to the first optical fiber adapter 600 through the first internal optical fiber 260, and the light-receiving component 500 is connected to the second optical fiber adapter 700 through the second internal optical fiber 270. The light-emitting component 400 and the light-receiving component 500 are electrically connected to the circuit board 300.

The external optical fiber 101 includes a first external optical fiber and a second external optical fiber. The first external optical fiber and the second external optical fiber are respectively connected to the first optical fiber adapter 600 and the second optical fiber adapter 700 through the optical port 250 of the optical module 200 and are respectively connected to the first internal optical fiber 260 and the second internal optical fiber 270 through the first optical fiber adapter 600 and the second optical fiber adapter 700.

For example, an end of the first internal optical fiber 260 is disposed in the first optical fiber adapter 600, and an end of the first external optical fiber is disposed in the first optical fiber adapter 600 and connected to the end of the first internal optical fiber 260. Similarly, an end of the second internal optical fiber 270 is disposed in the second optical fiber adapter 700, and an end of the second external optical fiber is disposed in the second optical fiber adapter 700 and connected to the end of the second internal optical fiber 270. In this way, the optical connection between the internal optical fibers and the external optical fibers of the optical module 200 may be realized through the optical fiber adapters (e.g., the first optical fiber adapter 600 and the second optical fiber adapter 700).

For example, a light carrying signals generated by the light-emitting component 400 is transmitted to the first internal optical fiber 260, and then transmitted to the first external optical fiber through the first internal optical fiber 260. The second external optical fiber transmits a light carrying signals to the second internal optical fiber 270, and then the light carrying signals is transmitted to the light-receiving component 500 through the second internal optical fiber 270.

In the optical module 200 in some embodiments of the present disclosure, the first optical fiber adapter 600 and the second optical fiber adapter 700 are disposed at the optical port 250. The upper shell 210 and the lower shell 220 are respectively provided with corresponding fixing mechanisms, which are configured to implement the fixation of the first optical fiber adapter 600 and the second optical fiber adapter 700.

Figure 5:
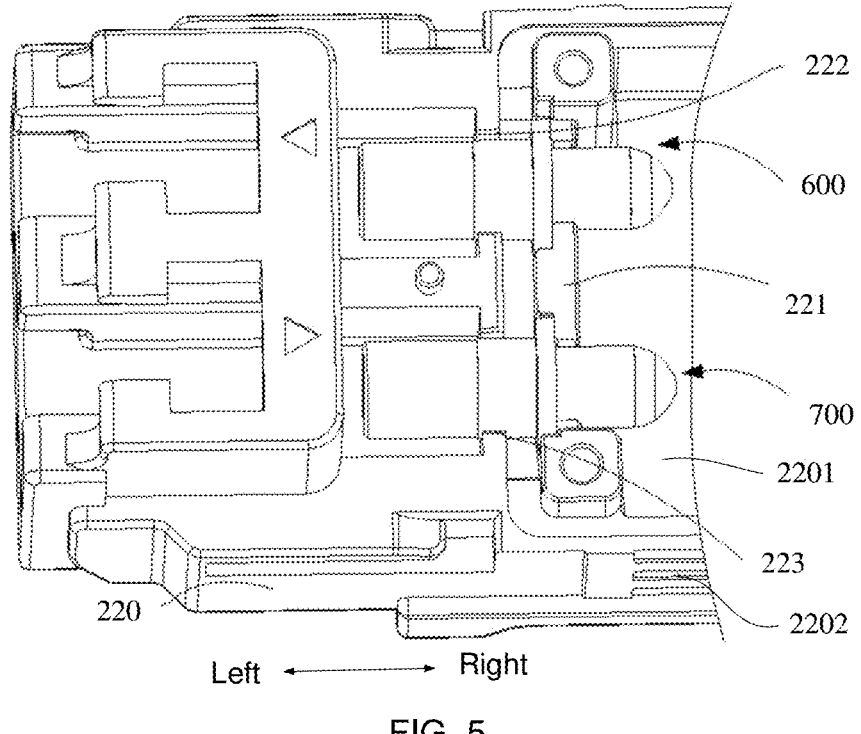
FIG. 5 is a structural diagram of a first optical fiber adapter, a second optical fiber adapter, and a lower shell of an optical module, in accordance with some embodiments.
Figure 6:
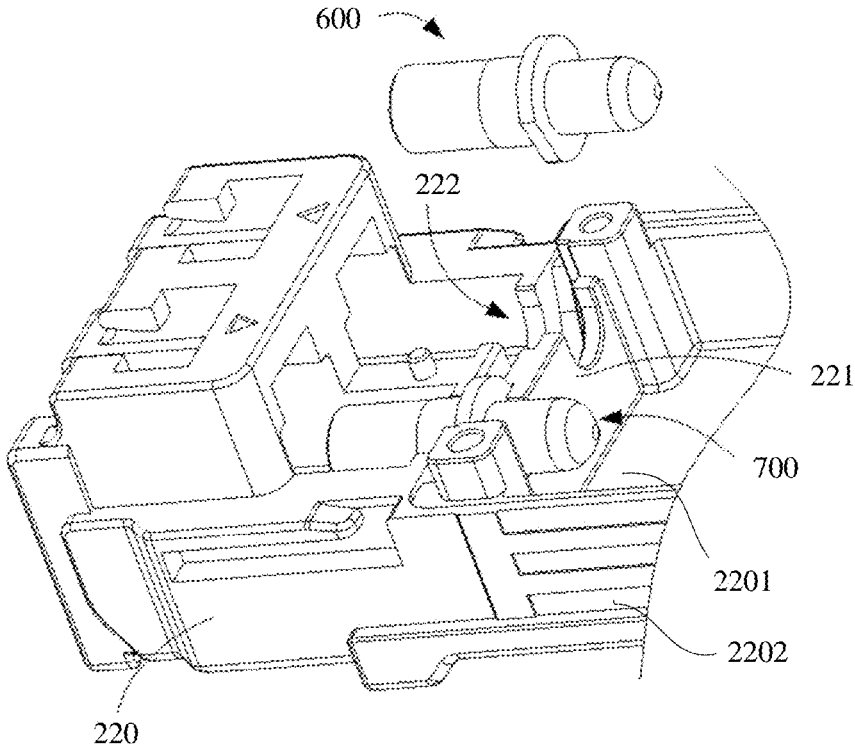
FIG. 6 is an exploded view of a first optical fiber adapter, a second optical fiber adapter, and a lower shell of an optical module, in accordance with some embodiments.

FIG. 5 is a structural diagram of a first optical fiber adapter, a second optical fiber adapter, and a lower shell of an optical module, in accordance with some embodiments; and FIG. 6 is an exploded view of a first optical fiber adapter, a second optical fiber adapter, and a lower shell of an optical module, in accordance with some embodiments.

In some embodiments, as shown in FIGS. 5 and 6, the lower shell 220 includes a first adapter fixing seat 221. The first adapter fixing seat 221 is disposed on the bottom plate 2201 and is proximate to the optical port 250. Correspondingly, the upper shell 210 includes a second adapter fixing seat. The first adapter fixing seat 221 cooperates with the second adapter fixing seat to fix the first optical fiber adapter 600 and the second optical fiber adapter 700.

In some embodiments, the first adapter fixing seat 221 includes a first installation groove group 222 and a second installation groove group 223, the first installation groove group 222 is configured to fix the first optical fiber adapter 600, and the second installation groove group 223 is configured to fix the second optical fiber adapter 700. For example, a portion of the first optical fiber adapter 600 is disposed in the first installation groove group 222, so as to limit the first optical fiber adapter 600 to move along an axial direction of the first optical fiber adapter 600 (i.e., a length direction of the optical module 200). A portion of the second optical fiber adapter 700 is disposed in the second installation groove group 223, so as to limit the second optical fiber adapter 700 to move along an axial direction of the second optical fiber adapter 700 (i.e., the length direction of the optical module 200).

In some embodiments, the second adapter fixing seat includes a third installation groove group and a fourth installation groove group. The third installation groove group cooperates with the first installation groove group 222 to fix the first optical fiber adapter 600, and the fourth installation groove group cooperates with the second installation groove group 223 to fix the second optical fiber adapter 700.

In this way, shaking and loosening of the first optical fiber adapter 600 and the second optical fiber adapter 700 during use may be effectively avoided, which is conducive to improving stability and reliability of the optical module 200 for transmitting and receiving the optical signal.

It will be noted that, in some embodiments, the upper shell 210 may not include the second adapter fixing seat, so as to simplify the structure of the upper shell 210. In this case, the fixing of the first optical fiber adapter 600 and the second optical fiber adapter 700 may be realized by disposing the portion of the first optical fiber adapter 600 and the portion of the second optical fiber adapter 700 in the first adapter fixing seat 221.

Figures 7, 8:
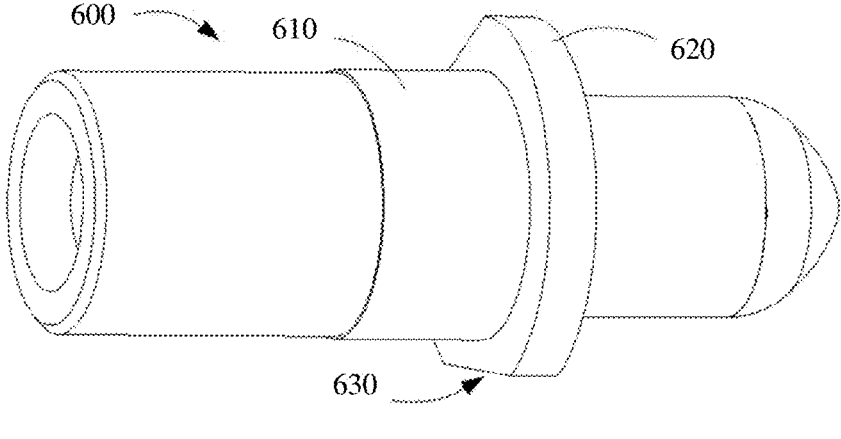
FIG. 7 is a perspective view of a first optical fiber adapter of an optical module, in accordance with some embodiments.
FIG. 8 is a perspective view of a first optical fiber adapter of an optical module from another perspective, in accordance with some embodiments.

FIG. 7 is a perspective view of a first optical fiber adapter of an optical module, in accordance with some embodiments; and FIG. 8 is a perspective view of a first optical fiber adapter of an optical module from another perspective, in accordance with some embodiments.

In some embodiments, as shown in FIGS. 7 and 8, the first optical fiber adapter 600 includes an adapter body 610 and a protrusion 620. The adapter body 610 is a cylindrical structure to satisfy optical module protocol requirements. One end of the adapter body 610 has a hollow structure configured to connect to an external optical fiber, and another end of the adapter body 610 is connected to the first internal optical fiber 260. For example, an end portion of the first internal optical fiber 260 extends into the another end of the adapter body 610.

The protrusion 620 extends along a circumferential direction of the adapter body 610 and is disposed on an outer circumferential surface of the adapter body 610. The protrusion 620 protrudes relative to the outer circumferential surface of the adapter body 610. The protrusion 620 is configured as an annular ring or a partial annular ring and is disposed in the first installation groove group 222, so that the first optical fiber adapter 600 is limited and fixed through the first installation groove group 222 and the protrusion 620. It will be noted that, a structure and fixing manner of the second optical fiber adapter 700 in some embodiments of the present disclosure is similar to the structure and fixing manner of the first optical fiber adapter 600, and details will not be repeated herein.

It can be understood that the protrusion 620 may limit the first optical fiber adapter 600 in the axial direction of the first optical fiber adapter 600, so that the first optical fiber adapter 600 is immovable in the axial direction of the first optical fiber adapter 600. However, the rotation of the first optical fiber adapter 600 in the first installation groove group 222 is not limited. During usage, when the first optical fiber adapter 600 rotates in the first installation groove group 222, it may cause the first internal optical fiber 260 to tear, thereby affecting the performance of the optical signal emitted by the optical module 200, and even resulting in a failure of a light-outputting path (e.g., unable to output the optical signal) of the optical module 200.

In some embodiments, the protrusion 620 may be configured as a non-circular plate, and an inner contour of the first installation groove group 222 is matched with the shape of the protrusion 620. In this way, the first optical fiber adapter 600 may be limited in the circumferential direction of the first optical fiber adapter 600 by disposing the protrusion 620 in the first installation groove group 222, thereby preventing the first optical fiber adapter 600 from rotating along the circumferential direction of the first optical fiber adapter 600.

In some embodiments, as shown in FIGS. 7 and 8, the first optical fiber adapter 600 further includes a positioning mechanism 630 disposed on the protrusion 620. The positioning mechanism 630 is configured to limit the first optical fiber adapter 600 in the circumferential direction of the first optical fiber adapter 600, so as to prevent the first optical fiber adapter 600 from rotating along the circumferential direction of the first optical fiber adapter 600.

For example, a portion of the protrusion 620 is recessed toward a direction proximate to the adapter body 610, or a portion of the protrusion 620 protrudes toward a direction away from the adapter body 610, so as to form the positioning mechanism 630. The inner contour of the first installation groove group 222 is matched with the shape of the positioning mechanism 630 and the protrusion 620. In this way, by the cooperation of the positioning mechanism 630 and the first installation groove group 222, the tearing of the first internal optical fiber 260 caused by the rotation of the first optical fiber adapter 600 may be avoided, which is conducive to improving the stability and reliability of the optical signal transmitted and received by the optical module 200.

The positioning mechanism 630 includes at least one positioning surface. In some embodiments, the positioning mechanism 630 includes a first positioning surface 631, and the first installation groove group 222 includes a first cooperating surface that cooperates with the first positioning surface 631. The positioning mechanism 630 is disposed in the first installation groove group 222, and the first positioning surface 631 abuts against the first cooperating surface, so as to prevent the first optical fiber adapter 600 from rotating along the circumferential direction of the first optical fiber adapter 600.

In some embodiments, as shown in FIG. 8, the positioning mechanism 630 further includes a second positioning surface 632. The second positioning surface 632 is inclined relative to the first positioning surface 631, and the first positioning surface 631 and the second positioning surface 632 are symmetrically disposed on the protrusion 620. In this case, the first installation groove group 222 further includes a second cooperating surface that cooperates with the second positioning surface 632. The positioning mechanism 630 is disposed in the first installation groove group 222, the first positioning surface 631 abuts against the first cooperating surface, and the second positioning surface 632 abuts against the second cooperating surface, thereby further preventing the first optical fiber adapter 600 from rotating along the circumferential direction. In addition, during a process of assembling the first optical fiber adapter 600 into the first installation groove group 222, it is convenient for staff to operate and prevent confusion.

Figure 9A:
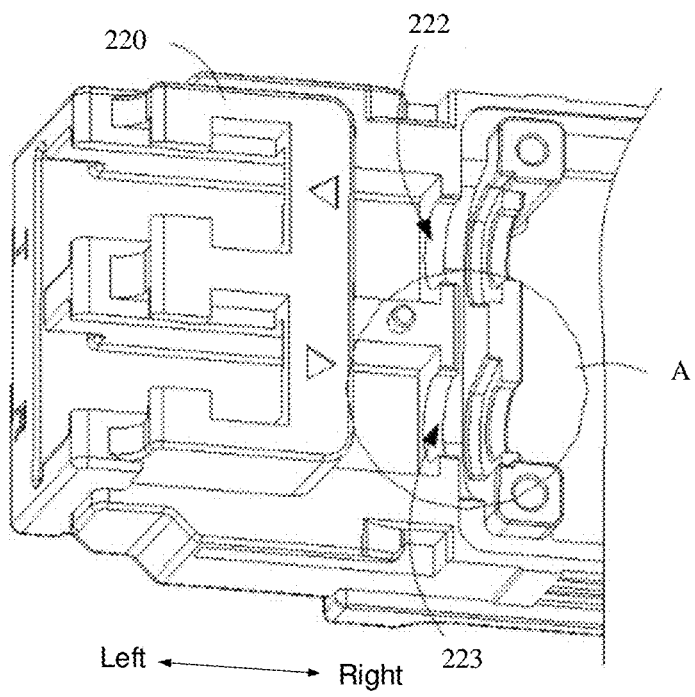
FIG. 9A is a local diagram showing a structure of a lower shell, in accordance with some embodiments.
Figure 9B:
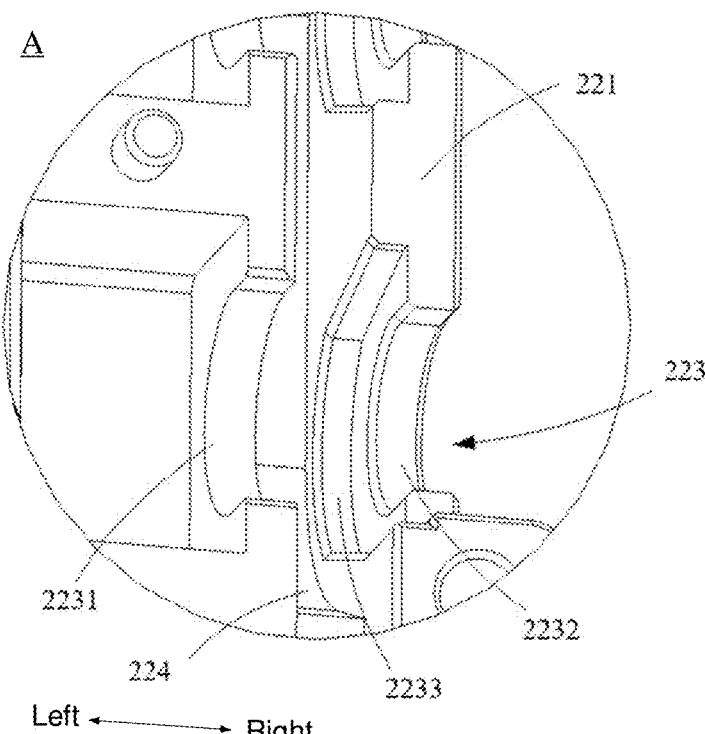
FIG. 9B is a partial enlarged view of the circle A in FIG. 9A.

FIG. 9A is a local diagram showing a structure of a lower shell, in accordance with some embodiments; and FIG. 9B is a partial enlarged view of the circle A in FIG. 9A.

As shown in FIGS. 9A and 9B, the first installation groove group 222 and the second installation groove group 223 are disposed side by side on the first adapter fixing seat 221, and a structure of the first installation groove group 222 is similar to a structure of the second installation groove group 223. Hereinafter, the structure of the installation groove groups (i.e., the first installation groove group 222 and the second installation groove group 223) will be introduced by considering the second installation groove group 223 as an example.

In some embodiments, the second installation groove group 223 includes a first supporting groove 2231, a second supporting groove 2232, and a first limiting groove 2233, and the first limiting groove 2233 is located between the first supporting groove 2231 and the second supporting groove 2232. Referring to a left-right direction shown in FIGS. 9A and 9B, the first supporting groove 2231 is disposed at a left side of the first limiting groove 2233, the second supporting groove 2232 is disposed at a right side of the first limiting groove 2233, and a groove bottom of the first limiting groove 2233 is closer to the bottom plate 2201 relative to groove bottoms of the first supporting groove 2231 and the second supporting groove 2232. The groove bottom of the first limiting groove 2233 is matched with the shape of the positioning mechanism of the optical fiber adapter.

In this way, the optical fiber adapter is disposed in the second installation groove group 223, the positioning mechanism of the optical fiber adapter is disposed in the first limiting groove 2233, so as to prevent the optical fiber adapter from rotating. In addition, the adapter body of the optical fiber adapter abuts against the first supporting groove 2231 and the second supporting groove 2232, thereby preventing the optical fiber adapter from moving along the axial direction of the optical fiber adapter in the first limiting groove 2233.

In some embodiments, the first adapter fixing seat 221 further includes a second limiting groove 224, and the second limiting groove 224 runs through the first installation groove group 222 and the second installation groove group 223 along an arrangement direction from the first installation groove group 222 to the second installation groove group 223 (i.e., a width direction of the optical module 200). For example, the second limiting groove 224 is located between the first limiting groove 2233 and the first supporting groove 2231 but is not limited thereto. The optical module 200 further includes a sealing member 280, and the second limiting groove 224 is configured to assemble the sealing member 280.

Figures 10, 11:
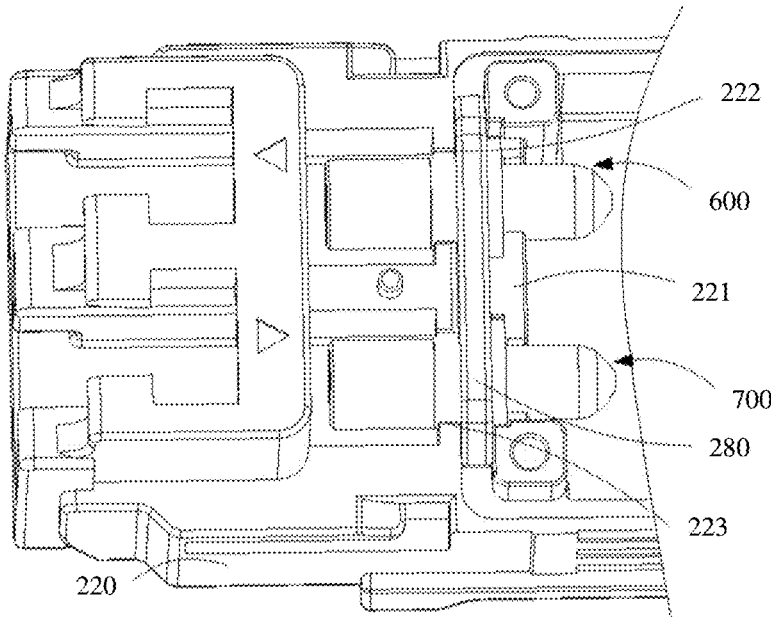
FIG. 10 is a local diagram showing a structure of a first optical fiber adapter, a second optical fiber adapter, a lower shell and a sealing member of an optical module, in accordance with some embodiments.
FIG. 11 is a structural diagram of a light-emitting component, a light-receiving component and a circuit board of an optical module, in accordance with some embodiments.

FIG. 10 is a local diagram showing a structure of a first optical fiber adapter, a second optical fiber adapter, a lower shell, and a sealing member of an optical module, in accordance with some embodiments.

In some embodiments, as shown in FIG. 10, the sealing member 280 is disposed in the second limiting groove 224 and sleeved on the outer circumferential surfaces of the first optical fiber adapter 600 and the second optical fiber adapter 700.

It can be understood that the first optical fiber adapter 600, the second optical fiber adapter 700, the upper shell 210, and the lower shell 220 will press the sealing member 280 in a case where the sealing member 280 is assembled in the second limiting groove 224, so that the sealing member 280 is sealingly connected with the first optical fiber adapter 600, the second optical fiber adapter 700, the upper shell 210, and the lower shell 220. In this way, in one aspect, the sealing inside the optical module 200 may be implemented, in another aspect, it is conducive to improving the reliability of the installation of the first optical fiber adapter 600 and the second optical fiber adapter 700.

FIG. 11 is a structural diagram of a light-emitting component, a light-receiving component, and a circuit board of an optical module, in accordance with some embodiments.

In some embodiments, as shown in FIG. 11, the circuit board 300 includes a circuit board body 300A and a mounting hole 310, and the mounting hole 310 runs through the circuit board body 300A along a thickness direction of the circuit board body 300A. The light-emitting component 400 is embedded and disposed in the mounting hole 310. The light-receiving component 500 is disposed on the surface of the circuit board 300.

It can be understood that the light-emitting component 400 is embedded in the mounting hole 310, thereby facilitating a portion of the circuit board 300 to extend into the light-emitting component 400, and facilitating electrical connection (e.g., through wire bonding) between the light-emitting component 400 and the circuit board 300.

In some embodiments, the mounting hole 310 is disposed on one side that extends along a length direction of the circuit board 300, the light-receiving component 500 is disposed on another side that extends along the length direction of the circuit board 300.

In some embodiments, the mounting hole 310 may further be disposed in the middle of the circuit board body 300A, the present disclosure is not limited thereto.

Figure 12:
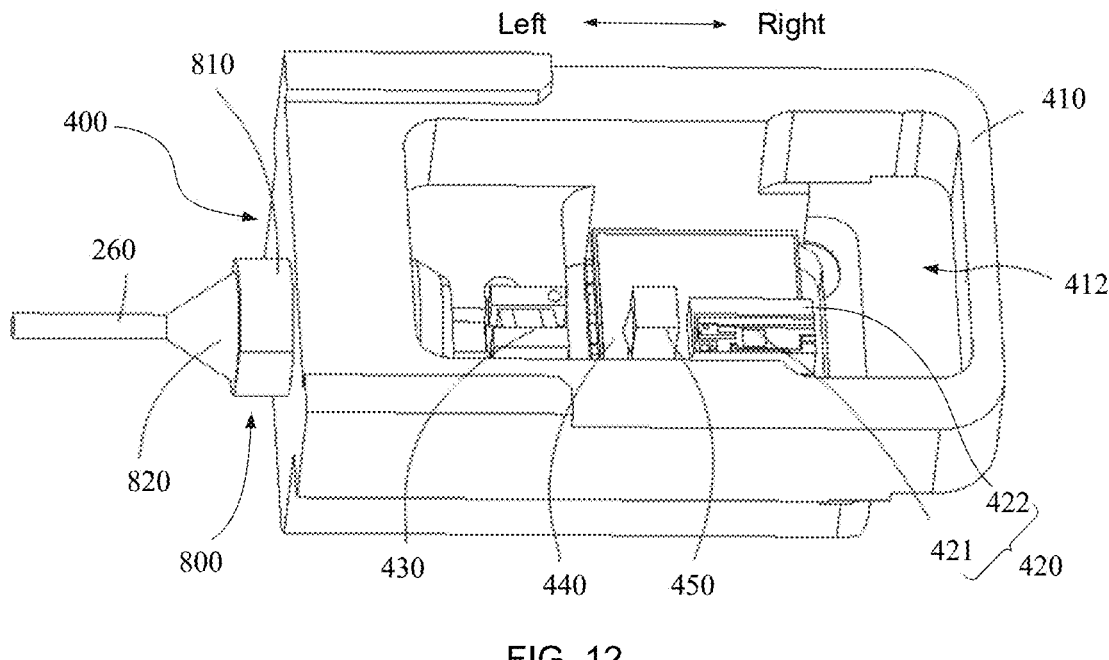
FIG. 12 is a perspective view of a light-emitting component of an optical module, in accordance with some embodiments.
Figure 13:
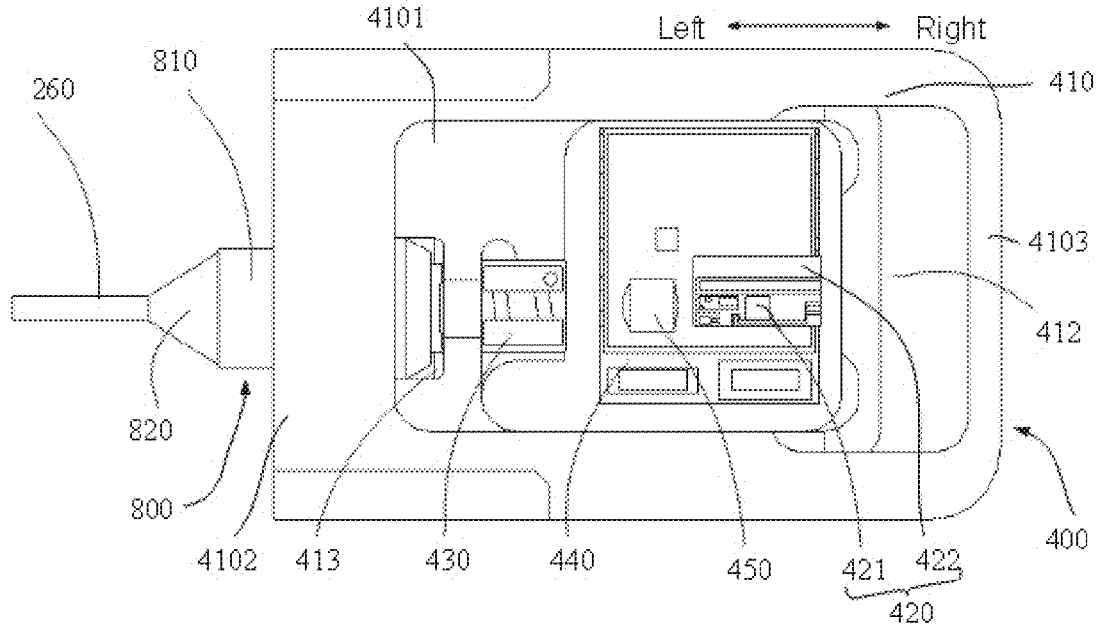
FIG. 13 is a structural diagram of a light-emitting component of an optical module, in accordance with some embodiments.

FIG. 12 is a perspective view of a light-emitting component of an optical module, in accordance with some embodiments; FIG. 13 is a structural diagram of a light-emitting component of an optical module, in accordance with some embodiments; and FIG. 14 is an exploded view of a light-emitting component of an optical module, in accordance with some embodiments.

Figure 14:
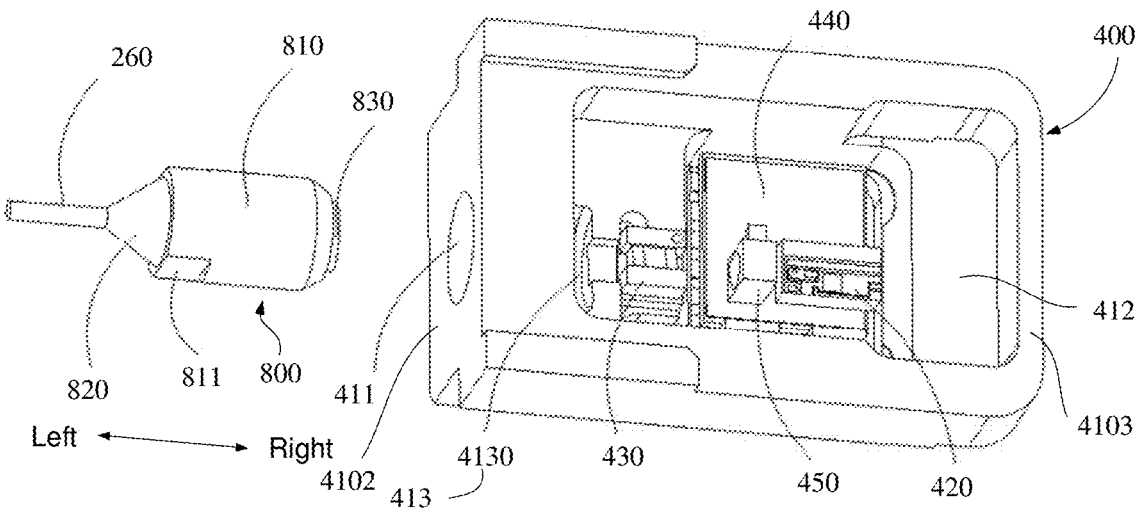
FIG. 14 is an exploded view of a light-emitting component of an optical module, in accordance with some embodiments.

In some embodiments, as shown in FIGS. 12 to 14, the light-emitting component 400 includes a light-emitting housing 410, electrical devices, and optical devices. The electrical devices and the optical devices are configured to emit the optical signal and are disposed in the light-emitting housing 410. The light-emitting housing 410 includes a through hole 411 and a first side wall 4102. The first side wall 4102 is a side wall of the light-emitting housing 410 proximate to the first optical fiber adapter 600. The through hole 411 is disposed in the first side wall 4102 and runs through the first side wall 4102 along a thickness direction of the first side wall 4102. The through hole 411 is configured to implement the optical connection between the light-emitting component 400 and the first internal optical fiber 260.

In some embodiments, the light-emitting housing 410 further includes an opening 412, and the through hole 411 and the opening 412 are respectively provided in two side walls of the light-emitting housing 410 opposite to each other. For example, the through hole 411 and the opening 412 are disposed in two side walls of the light-emitting housing 410 along the length direction of the optical module 200 (i.e., a left-right direction shown in FIG. 12), so as to facilitate the arrangement and installation of the electrical devices and the optical devices in the light-emitting component 400.

For example, the light-emitting housing 410 further includes a second side wall 4103. The second side wall 4103 is a side wall of the light-emitting housing 410 away from the first optical fiber adapter 600 (i.e., the second side wall 4103 is disposed opposite to the first side wall 4102). The opening 412 is disposed in the second side wall 4103 and runs through the second side wall 4103 along a thickness direction of the second side wall 4103.

For example, the opening 412 is configured for a portion of the circuit board 300 to be inserted into the light-emitting housing 410, so as to facilitate electrical connection between the electrical devices in the light-emitting housing 410 and the circuit board 300.

In some embodiments, as shown in FIGS. 12 to 14, the light-emitting component 400 further includes a light-emitting assembly 420. The light-emitting assembly 420 is disposed in the light-emitting housing 410 and is configured to generate the optical signal. It will be noted that the number of light-emitting assemblies 420 is not limited as shown in FIGS. 12 to 14, that is, the light-emitting component 400 may include one light-emitting assembly 420 or a plurality of light-emitting assemblies 420. In a case where the light-emitting component 400 includes the plurality of light-emitting assemblies 420, the plurality of light-emitting assemblies 420 are disposed at intervals in the light-emitting component 400 along a direction (i.e., the width direction of the optical module 200) perpendicular to the left-right direction and are configured to emit a plurality of optical signals.

Figure 16:
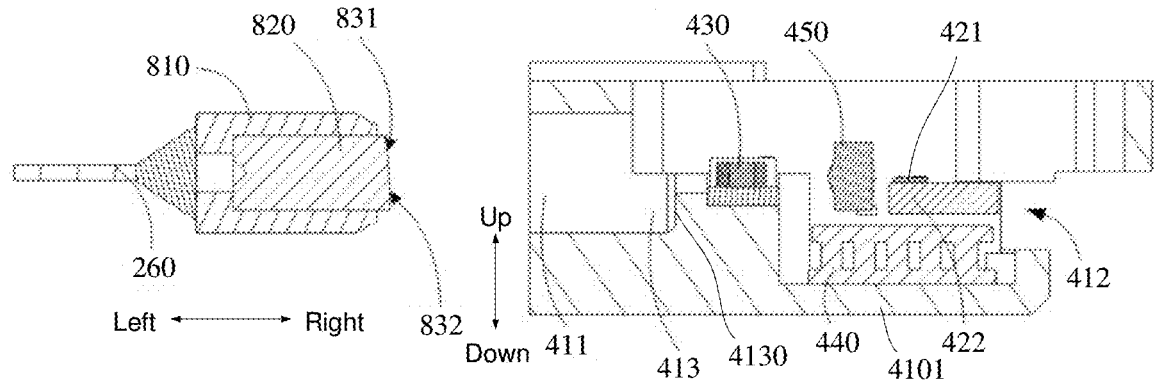
FIG. 16 is a cross-sectional view of a light-emitting component of an optical module in an explosive state, in accordance with some embodiments.

In some embodiments, referring to FIG. 16, the light-emitting assembly 420 includes a light-emitting chip 421, a metallized ceramic 422, and a lens 450. The light-emitting chip 421 is disposed on a top of the metallized ceramic 422 and is configured to emit the optical signal. A circuit pattern is formed on a surface of the metallized ceramic 422, so as to supply power to the light-emitting chip 421. In addition, the metallized ceramic 422 has good thermal conductivity and may be used as a heat sink of the light-emitting chip 421, so as to assist the light-emitting chip 421 to dissipate heat. The lens 450 is located on a light-emitting path of the light-emitting chip 421. The lens 450 is configured to converge or collimate the optical signal emitted by the light-emitting chip 421. It can be understood that the optical signal emitted by the light-emitting chip 421 is in a diverging state, therefore, the optical signal emitted by the light-emitting chip 421 is converged or collimated through the lens, which is convenient for subsequent optical path design and coupling of the optical signal into the optical fiber.

In some embodiments, as shown in FIGS. 12 to 14, the light-emitting component 400 further includes a thermo electric cooler 440 (TEC) and a bottom wall 4101. The thermo electric cooler 440 is disposed on the bottom wall 4101, and the metallized ceramic 422 is disposed above the thermo electric cooler 440. The thermo electric cooler 440 is configured to balance heat, so as to maintain an operating temperature of the light-emitting chip 421. For example, the metallized ceramic 422 is disposed on a top of the thermo electric cooler 440, or the metallized ceramic 422 is spaced apart from the top of thermo electric cooler 440 by a certain distance.

In some embodiments, as shown in FIGS. 12 to 14, the optical module 200 further includes an optical fiber connection assembly 800. The optical fiber connection assembly 800 is configured to connect and fix the first internal optical fiber 260, so that the first internal optical fiber 260 is convenient to establish optical connection with the light-emitting component 400.

The optical fiber connection assembly 800 includes an optical fiber connector 810 and an optical fiber ferrule 820. The optical fiber ferrule 820 is disposed in the optical fiber connector 810. The optical fiber ferrule 820 extends through the optical fiber connector 810 along a length direction of the optical fiber connector 810 (i.e., a left-right direction as shown in FIG. 14). The optical fiber connector 810 is inserted into the through hole 411 and is configured to protect the optical fiber ferrule 820. One end of the optical fiber ferrule 820 extends into the light-emitting housing 410 through the through hole 411, and another end of the optical fiber ferrule 820 is optically connected to the first internal optical fiber 260.

It can be understood that the first internal optical fiber 260 is slender and flexible, which is difficult to perform high-precision positioning and connection with the light-emitting component 400. Therefore, by fixedly connecting the optical fiber connector 810 to the light-emitting housing 410 and then connecting the first internal optical fiber 260 to the optical fiber ferrule 820, the high-precision positioning and connection between the first internal optical fiber 260 and the light-emitting component 400 is easy to implement.

For example, the optical fiber ferrule 820 is made of ceramic material and wraps the end portion of the first internal optical fiber 260. The processing precision of the ceramics is high, and a position of the end portion of the first internal optical fiber 260 may be aligned with the light-emitting path of the light-emitting assembly 420 with high precision through wrapping the end portion of the first internal optical fiber 260 with the ceramic material.

For example, the optical fiber ferrule 820 is cylindrical. The first internal optical fiber 260 is inserted into the optical fiber ferrule 820, and an orthogonal projection of an axis of the first internal optical fiber 260 on a reference plane is substantially coincident with an orthogonal projection of an axis of the optical fiber ferrule 820 on the reference plane. For example, the axis of the first internal optical fiber 260 is substantially coincident with the axis of the optical fiber ferrule 820, or the axis of the first internal optical fiber 260 is located above or below the axis of the optical fiber ferrule 820, thereby facilitating reception of the optical signal emitted by the light-emitting component 420 at the end portion of the first internal optical fiber 260.

In some embodiments, the optical fiber ferrule 820 includes a light incident end surface 830. The light incident end surface 830 protrudes from an end of the optical fiber connector 810 and located outside the optical fiber connector 810. The optical fiber connector 810 is inserted into the through hole 411, and the light incident end surface 830 is located in the light-emitting housing 410.

In some embodiments, the optical fiber connector 810 is bonded to an inner wall of the through hole 411 by means of glue, so as to improve the reliability of the connection between the optical fiber connector 810 and the light-emitting housing 410.

For example, as shown in FIG. 14, the optical fiber connector 810 is substantially annular and includes a clamping surface 811. A portion of an outer wall of the optical fiber connector 810 is configured as the clamping surface 811, and the clamping surface 811 is proximate to an end of the optical fiber connector 810 away from the light incident end surface 830. The clamping surface 811 is substantially parallel to a symmetrical plane of the optical fiber connector 810 passing through the axis.

It can be understood that, when inserting the optical fiber connector 810 into the through hole 411, it is necessary to clamp the outer wall of the optical fiber connector 810 with a clamping tool (e.g., a tweezer) for installation. The optical fiber connector 810 is in the shape of the annular ring, and the clamping tool is inconvenient to apply force. Therefore, by forming the clamping surface 811 on the outer wall of the optical fiber connector 810, the contact area between the clamping tool and the optical fiber connector 810 may be increased, thereby facilitating the clamping and applying force of the clamping tool, which is conducive to reducing the difficulty of assembling the optical fiber connection assembly 800.

As described above, since the internal optical fibers are optically connected to the external optical fibers through the optical fiber adapters provided in the optical module shell 200A, it is necessary to provide a structure for fixing the optical fiber adapters in the optical module shell 200A (e.g., an adapter fixing seat), so as to prevent the optical fiber adapters from moving or rotating in the optical module shell 200A, causing damage (e.g., tearing) to the internal optical fibers. In addition, the first internal optical fiber 260 further needs to be optically connected to the light-emitting component 400, therefore, it is necessary to provide the optical fiber connection assembly 800 in the optical module 200. Another end of the first internal optical fiber 260 is disposed in the optical fiber connection assembly 800, and then the optical fiber connection assembly 800 is disposed in the light-emitting component 400, so as to facilitate a coupling of the first internal optical fiber 260 with a light-emitting path of the light-emitting component 400.

Figure 15:
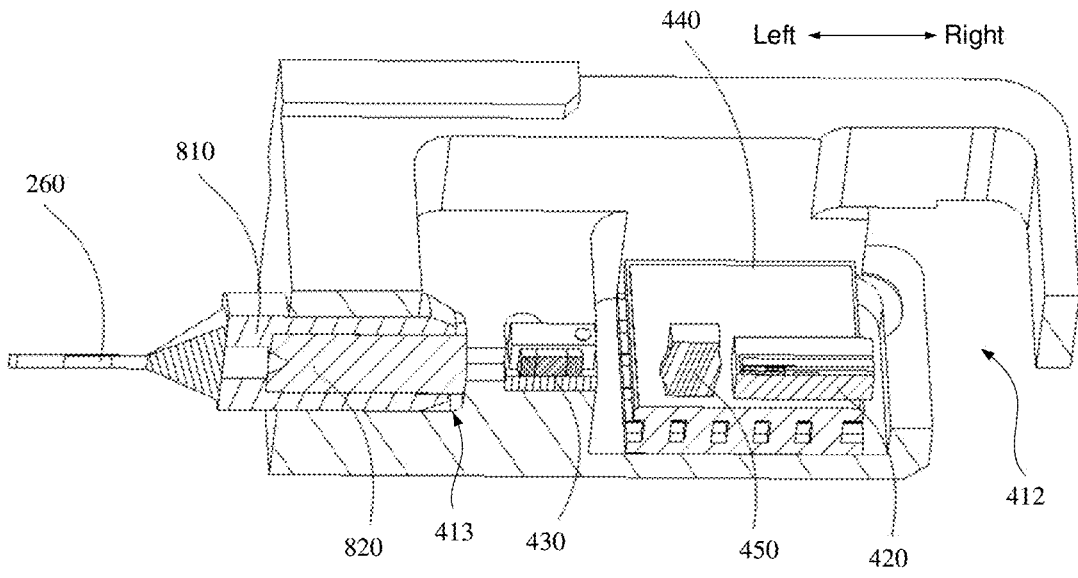
FIG. 15 is a sectional view of a light-emitting component of an optical module, in accordance with some embodiments.

FIG. 15 is a sectional view of a light-emitting component of an optical module, in accordance with some embodiments. FIG. 16 is a cross-sectional view of a light-emitting component of an optical module in an explosive state, in accordance with some embodiments.

In some embodiments, as shown in FIGS. 14 to 16, the light-emitting housing 410 further includes an assembling groove 413. The assembling groove 413 is disposed on the bottom wall 4101. The assembling groove 413 is located on a side of the through hole 411 proximate to the opening 412 and is communicated with the through hole 411. The assembling groove 413 includes a limiting wall 4130 (referring to FIG. 16). The limiting wall 4130 is a side wall of the assembling groove 413 proximate to the opening 412.

The light incident end surface 830 is located in the assembling groove 413, and a portion of the light incident end surface 830 (e.g., a lower portion) abuts against the limiting wall 4130. The limiting wall 4130 is configured to limit the optical fiber connection assembly 800 to move to the right, thereby facilitating the assembly of the optical fiber connection assembly 800.

In some embodiments, in order to couple the optical signal emitted by the light-emitting chip 421 into the first internal optical fiber 260, the light-emitting component 400 includes at least a collimating lens and a converging lens, and the collimating lens is closer to the light-emitting chip 421 than the converging lens. The collimating lens is configured to collimate a divergent optical signal emitted by the light-emitting chip 421 to a collimated optical signal. The converging lens is configured to converge the collimated optical signal to a converged optical signal and transmit the converged optical signal into the first internal optical fiber 260.

In the actual assembly process, the light-emitting chip 421 and the collimating lens are usually fixed relative to the light-emitting housing 410 first, and then the optical fiber connection assembly 800 is fixed relative to the light-emitting housing 410 (e.g., by placing the light incident end surface 830 abut against the limiting wall 4130). In this case, the optical signal may be coupled into the first internal optical fiber 260 by adjusting a light incident angle and a light exit angle of the converging lens.

However, in the above-mentioned embodiments, the two lenses (i.e., the collimating lens and the converging lens) need to be disposed in the light-emitting housing 410, so as to implement the optical path coupling between the light-emitting chip 421 and the first internal optical fiber 260. The two lenses need to occupy more internal space of the light-emitting housing 410, which is not conducive to a miniaturization of the optical module 200, and the cost is high.

In some embodiments, as shown in FIGS. 12 to 14, the light-emitting component 400 further includes a lens 450, and the lens 450 is a converging lens. The lens 450 is configured to converge the divergent optical signal emitted by the light-emitting chip 421 to one point, and the convergent point of the divergent optical signal is a focal point of the lens 450. A plane where the limiting wall 4130 is located is coplanar with a plane passing through the focal point of the lens 450 and perpendicular to the length direction of the optical module 200.

It can be understood that the first internal optical fiber 260 is inserted in the optical fiber ferrule 820, and a portion of the first internal optical fiber 260 located in the optical fiber ferrule 820 and the optical fiber connection assembly 800 may be regarded as a whole.

In this way, in the actual assembly process, the lens 450 and the light-emitting chip 421 may be fixed relative to the light-emitting housing 410 first, and then the optical fiber connection assembly 800 is inserted into the assembling groove 413 through the through hole 411, so that the portion of the light incident end surface 830 abuts against the limiting wall 4130. In this case, a position of an end surface of the first internal optical fiber 260 proximate to the light-emitting chip 421 is substantially coincided with a position of the focal point of the lens 450, so that the optical signal emitted by the light-emitting chip 421 is directly incident on the end surface of the first internal optical fiber 260 after being converged by the lens 450, which is conducive to improving the coupling precision between the first internal optical fiber 260 and the light-emitting path of the light-emitting chip 421.

It can be understood that, with the above arrangement, one lens (e.g., the collimating lens) can be omitted, thereby reducing a volume of the light-emitting housing 410 and reducing an occupied space, which is conducive to the miniaturization of the optical module 200 and reducing the cost.

The present disclosure is not limited thereto. In some embodiments, when assembling the light-emitting component 400, the optical fiber connection assembly 800 and the light-emitting chip 421 may be fixed relative to the light-emitting housing 410 first, and then the optical signal may be coupled to the first internal optical fiber 260 by adjusting the position, the light incident angle and the light exit angle of the lens 450.

It can be understood that, by limiting the optical fiber connection assembly 800 through the assembling groove 413 (e.g., the limiting wall 4130), one end of the first internal optical fiber 260 inserted into the optical fiber ferrule 820 may be fixed relative to the light-emitting path of the light-emitting assembly 420. In this case, by adjusting the position, the light incident angle and the light exit angle of the lens 450, the coupling of the optical signal into the first internal optical fiber 260 may be achieved, which is conducive to reducing the difficulty of assembling the first internal optical fiber 260 and improving the coupling precision between the first internal optical fiber 260 and the light-emitting path of the light-emitting chip 421.

It will be noted that a depth of the assembling groove 413 may be set according to actual requirements, the present disclosure is not limited thereto. For example, as the depth of the assembling groove 413 increases, a reliability of positioning of the assembling groove 413 to the first internal optical fiber 260 may be improved. However, in a case where the depth of the assembling groove 413 is too large, it will hinder the optical fiber ferrule 820 from receiving the optical signal. In this case, a notch may be disposed at a position where the optical fiber ferrule 820 receives the optical signal, so that the optical signal may be incident into the first internal optical fiber 260 through the notch. The depth of the assembling groove 413 may refer to the thickness direction of the optical module 200, that is, an up-down direction as shown in FIG. 16.

In some embodiments, another portion of the light incident end surface 830 is configured as an inclined surface, that is, the another portion of the light incident end surface 830 is not perpendicular to the axis of the optical fiber ferrule 820. For example, an angle between the inclined surface and the axis of the optical fiber ferrule 820 is any value in a range from 83° to 87°, inclusive. For example, the included angle between the inclined surface and the axis of the optical fiber ferrule 820 is 83°, 86° or 87°.

As shown in FIG. 16, the light incident end surface 830 includes an inclined surface 831 and a vertical surface 832. The inclined surface 831 is inclined relative to the axis of the optical fiber ferrule 820, and an angle between the vertical surface 832 and the axis of the optical fiber ferrule 820 is 90°. The inclined surface 831 is located on a side of the vertical surface 832 away from the bottom wall 4101 and is configured to transmit the optical signal. The vertical surface 832 corresponds to a position of the limiting wall 4130 and abuts against the limiting wall 4130. In this way, it is convenient to assemble the light incident end surface 830 in the light-emitting housing 410.

In some embodiments, in the thickness direction of the optical module 200, a dimension of the vertical surface 832 is less than or equal to the depth of the assembling groove 413 (i.e., a dimension of the limiting wall 4130), so as to prevent the limiting wall 4130 from blocking the inclined surface 831 and hinder the inclined surface 831 from receiving the optical signal.

In some embodiments, a portion of the optical fiber ferrule 820 protrudes from the optical fiber connector 810, that is, the portion of the optical fiber ferrule 820 is located outside the optical fiber connector 810. In this way, through two sides of an orthogonal projection of the portion of the optical fiber ferrule 820 on the bottom wall 4101, a centerline of the two sides may be obtained, and the centerline is also an orthogonal projection of the axis of the first internal optical fiber 260 on the bottom wall 4101. The light-emitting assembly 420 may be positioned and disposed through the centerline, so that a tolerance between an optical axis of the light-emitting assembly 420 and the axis of the end portion of the first internal optical fiber 260 may be reduced, which is conducive to reducing the assembly error between the first internal optical fiber 260 and the light-emitting assembly 420.

For example, during the actual operation, a shadow of the portion of the optical fiber ferrule 820 on the bottom wall 4101 may be obtained by lighting from directly above the portion of the optical fiber ferrule 820 toward directly below. Through two sides of the shadow, a centerline of the shadow may be obtained, which is the orthogonal projection of the axis of the first internal optical fiber 260 on the bottom wall 4101.

It can be understood that the optical signal emitted by the light-emitting assembly 420 is transmitted to the end portion of the first internal optical fiber 260 through the light incident end surface 830 of the optical fiber connector 810 after passing through the optical devices (e.g., the lens and the isolator) in the light-emitting housing 410, and then enter the first internal optical fiber 260. Therefore, by positioning the end portion of the first internal optical fiber 260, and then adjusting a light-emitting angle of the light-emitting assembly 420, the optical axis of the light-emitting assembly 420 is substantially coincided with the axis of the end portion of the first internal optical fiber 260, which is conducive to reducing the difficulty of assembling the light-emitting component 400 and improving the assembling precision of the light-emitting component 400.

In some embodiments, the optical fiber connector 810 is made of a transparent and hard material that can be processed with high precision. The first internal optical fiber 260 is also made of a transparent material. For example, the optical fiber connector 810 is a transparent material member (e.g., a transparent plastic member, or a glass member). Generally, a transparency of the optical fiber connector 810 is different from a transparency of the first internal optical fiber 260.

In this case, a shadow of the portion of the optical fiber ferrule 820 and a shadow of the end portion of the first internal optical fiber 260 may be obtained on the bottom wall 4101 by lighting from directly above the portion of the optical fiber ferrule 820 toward directly below. In this way, a centerline of the two sides may be obtained through the two sides of the shadow of the end portion of the first internal optical fiber 260, which is the orthogonal projection of the axis of the end portion of the first internal optical fiber 260 on the bottom wall 4101.

The light-emitting assembly 420 may be positioned and disposed through the centerline, which may further reduce the tolerance between the optical axis of the light-emitting assembly 420 and the axis of the end portion of the first internal optical fiber 260 and reduce the assembly error between the first internal optical fiber 260 and the light-emitting assembly 420.

In some embodiments, as shown in FIGS. 14 to 16, the light-emitting component 400 further includes an isolator 430, and the isolator 430 is disposed in the light-emitting housing 410 and is proximate to the optical fiber connector 810. The isolator 430 is located on the optical path from the light-emitting assembly 420 to the optical fiber connector 810 and is configured to transmit the optical signal from the light-emitting assembly 420 and reflect the optical signal from the optical fiber connector 810, so as to prevent the optical signal reflected by the ends of the optical fiber connector 810 and the first internal optical fiber 260 from entering the light-emitting path of the light-emitting assembly 420 again.

In some embodiments, the lens 450 is disposed in the light-emitting housing 410. The lens 450 is located between the isolator 430 and the light-emitting assembly 420 and is located on the optical path from the light-emitting assembly 420 to the isolator 430. The lens 450 is, for example, a collimating lens, and is configured to collimate the optical signal generated by the light-emitting assembly 420. For example, the divergent optical signal output by the light-emitting chip 421 is collimated by the collimating lens into a parallel optical signal.

In some embodiments, the light-receiving component 500 includes optical devices and photoelectric conversion devices. The optical devices include an optical fiber connector, an arrayed waveguide grating (AWG), or a lens. The photoelectric conversion devices include a light-receiving chip, or a transimpedance amplifier. The light-receiving chip includes a photodetector (PD), and the photodetector is, for example, an avalanche photodiode (APD), or a PIN photodiode (PIN-PD). The light-receiving chip is configured to convert a received optical signal to an electrical signal.

For example, the second internal optical fiber 270 transmits the optical signal to the optical devices. The optical devices change a transmission path of the optical signal and transmit the optical signal to the photoelectric conversion devices. The photoelectric conversion devices receive the optical signal and convert the optical signal into the electrical signal.

In some other embodiments, the light-receiving component 500 includes an array waveguide grating, a light-receiving chip, and a transimpedance amplifier. An input terminal of the arrayed waveguide grating is connected to the second internal optical fiber 270, and an output terminal of the arrayed waveguide grating covers the light-receiving chip. The light-receiving chip is bonded to the surface of the circuit board 300, and the transimpedance amplifier is bonded to the circuit board 300 and located at a side of the light-receiving chip.

Figure 17:
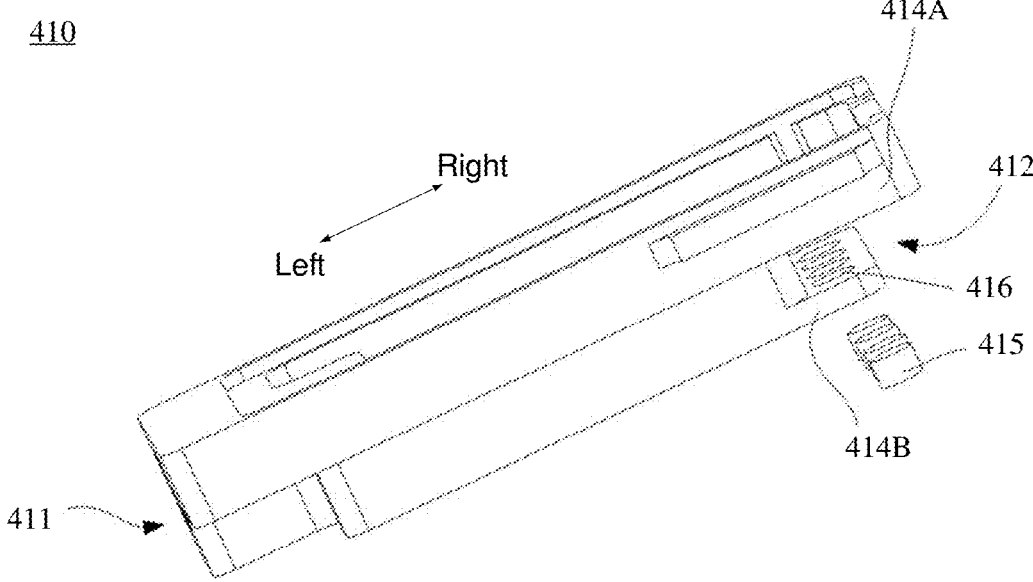
FIG. 17 is an exploded view of a light-emitting housing of an optical module, in accordance with some embodiments.

FIG. 17 is an exploded view of a light-emitting housing of an optical module, in accordance with some embodiments.

Figure 22A:
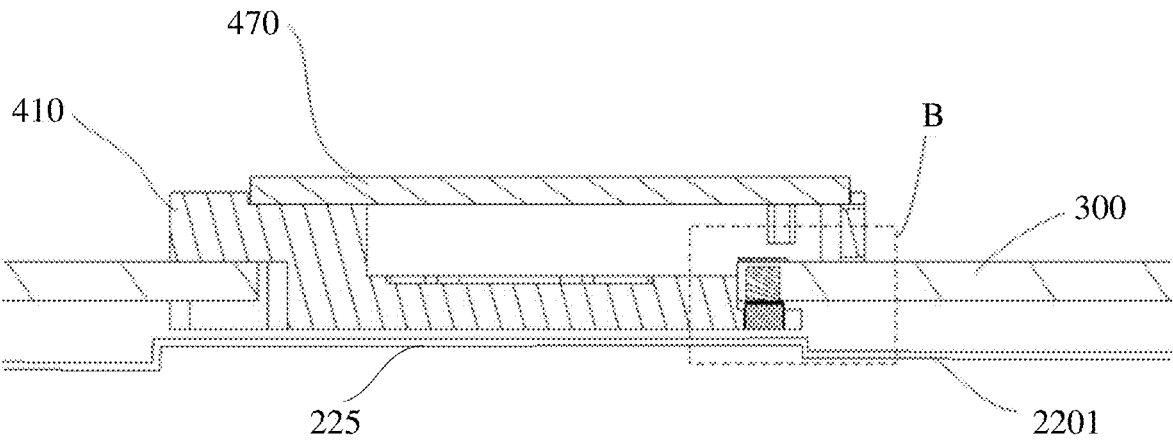
FIG. 22A is a cross-sectional view showing a partial structure of an optical module, in accordance with some embodiments.

As shown in FIG. 17, the light-emitting component 400 includes the light-emitting housing 410 and a light-emitting cover plate 470 (referring to FIG. 22A). The light-emitting housing 410 is a hollow cuboid structure, and a side of the light-emitting housing 410 is open. The light-emitting cover plate 470 is covered on the open side of the light-emitting housing 410, so as to define a light-emitting cavity between the light-emitting cover plate 470 and the light-emitting housing 410. The light-emitting housing 410 includes the through hole 411, the opening 412, a first protruding portion 414A and a second protruding portion 414B.

The through hole 411 is disposed in a side wall (i.e., the first side wall) of the light-emitting housing 410 proximate to the first optical fiber adapter 600. The through hole 411 is configured to implement the optical connection of the light-emitting component 400 and the first internal optical fiber 260. The opening 412 is disposed in a side wall (i.e., a second side wall) of the light-emitting housing 410 away from the first optical fiber adapter 600. The opening 412 is configured for a portion of the circuit board 300 to be inserted into the light-emitting housing 410, so as to facilitate the electrical connection of the electrical devices in the light-emitting housing 410 with the circuit board 300.

The second side wall of the light-emitting housing 410 includes a first portion and a second portion. The first portion protrudes toward a direction away from the first optical fiber adapter 600, so as to form a first protruding portion 414A, and the second portion protrudes toward the direction away from the first optical fiber adapter 600, so as to form a second protruding portion 414B. The opening 412 is located between the first protruding portion 414A and the second protruding portion 414B. A side of the first protruding portion 414A away from the second protruding portion 414B is connected to the light-emitting cover plate 470.

For example, along a thickness direction of the circuit board 300, the first protruding portion 414A and the second protruding portion 414B are respectively located on two sides of the opening 412. A portion of the circuit board 300 is inserted into the opening 412 from between the first protruding portion 414A and the second protruding portion 414B and is electrically connected to the electrical devices in the light-emitting housing 410.

In some embodiments, an inner of the first protruding portion 414A is hollow to form an accommodating cavity. The accommodating cavity communicates with the light-emitting cavity, so as to increase an area of the circuit board 300 inside the light-emitting component 400 and increase the installation space of the electrical devices.

Along the length direction of the optical module 200 (i.e., a left-right direction shown in FIG. 17), a dimension of an orthogonal projection of the first protruding portion 414A on the lower shell 220 is larger than a dimension of an orthogonal projection of the second protruding portion 414B on the lower shell 220. An end surface of the first protruding portion 414A away from the second side wall 4103 is further away from the second side wall 4103 than an end surface of the second protruding portion 414B away from the second side wall 4103. For example, a distance between an end surface of the second protruding portion 414B away from the through hole 411 and the through hole 411 is smaller than a distance between an end surface of the first protruding portion 414A away from the through hole 411 and the through hole 411.

In some embodiments, the light-emitting housing 410 and the light-emitting cover plate 470 are Kovar members, that is, the light-emitting housing 410 and the light-emitting cover plate 470 are made of Kovar. Kovar has high strength and good corrosion resistance, which may improve the reliability of the light-emitting housing 410 and the light-emitting cover plate 470 and prolong the service life of the light-emitting housing 410 and the light-emitting cover plate 470. In addition, Kovar further has good thermal conductivity, so as to assist the electrical devices in the light-emitting component 400 to dissipate heat, which is conducive to improving the light-emitting performance of the light-emitting component 400.

Figure 19:
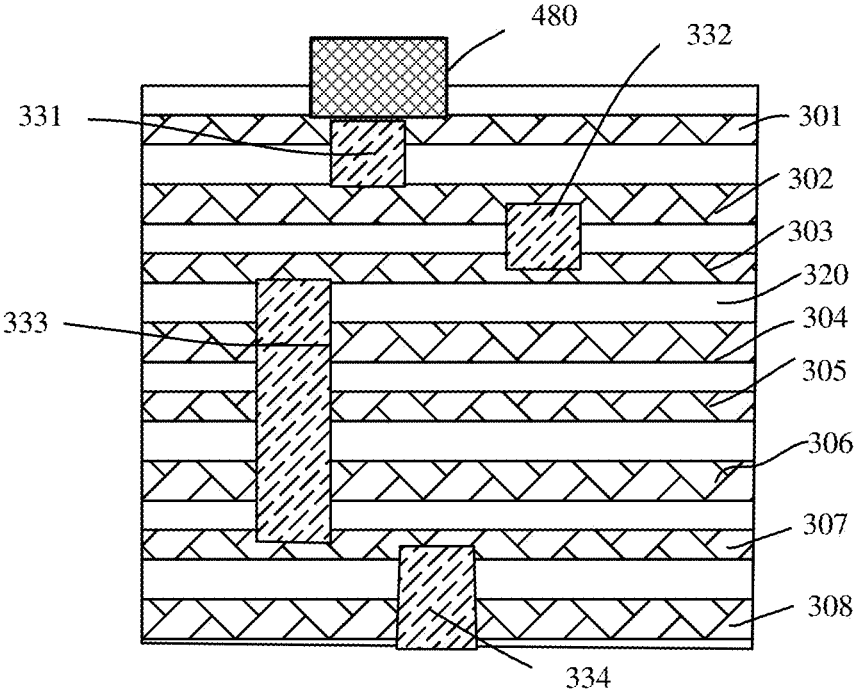
FIG. 19 is a schematic diagram of a board layer structure of another circuit board of an optical module, in accordance with some embodiments.

In some embodiments, the light-emitting component 400 further includes a light-emitting driving chip 480 (referring to FIG. 19). The light-emitting driving chip 480 is configured to drive the light-emitting chip 421 to emit the optical signal. The light-emitting driving chip 480 is disposed on the circuit board 300 and located in the light-emitting cavity. That is, the light-emitting driving chip 480 is disposed on the portion of the circuit board 300 inserted into the light-emitting housing 410. In this way, the light-emitting assembly 420 may be physically isolated from other optical devices and electrical devices outside the light-emitting component 400, so that the optical power of the optical signal emitted by the light-emitting assembly 420 may be increased, and the interference from the optical fiber outside the light-emitting component 400 on the optical signal emitted by the light-emitting assembly 420 may be reduced.

In the optical module 200, there are more and more components integrated by a plurality of chips or other electrical devices, and the power density of these integrated components is constantly increasing. It can be understood that, when the power density of the chips is too high, the heat will be concentrated at the chip and is difficult to dissipate, thereby affecting the photoelectric performance of the optical module 200.

Generally, a size of the light-emitting driving chip 480 is small, and the power of the light-emitting driving chip 480 is high. Therefore, the light-emitting driving chip 480 has a high power consumption density. In this case, it is necessary to perform heat dissipation on the light-emitting driving chip 480, so as to avoid an impact on the photoelectric performance of the optical module 200 caused by the high temperature of the light-emitting driving chip 480.

In some embodiments, the circuit board 300 is a rigid circuit board formed by stacking a plurality of board layers, for example, copper boards. A medium such as glass optical fiber or epoxy resin is filled between the plurality of copper boards. As described above, in a case where the light-emitting driving chip 480 is disposed on the circuit board 300, a large amount of heat will be generated and transferred to the circuit board 300. Since the medium such as glass optical fiber or epoxy resin has a certain heat insulation property, the heat in the circuit board 300 is mostly diffused horizontally along the copper boards, and only a small amount of heat is vertically transferred along the thickness direction of the circuit board 300. As a result, excessive heat will be accumulated in the light-emitting cavity, thereby affecting the light-emitting performance of the light-emitting assembly 420.

Figure 18:
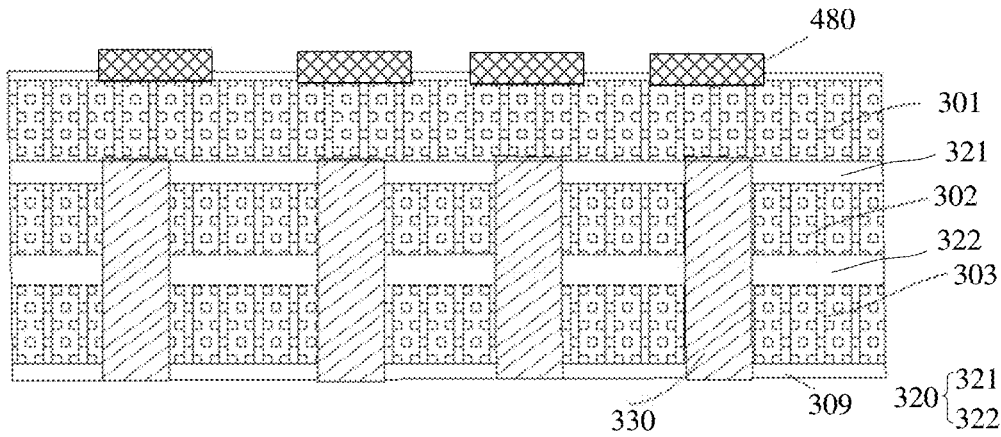
FIG. 18 is a schematic diagram of a board layer structure of a circuit board of an optical module, in accordance with some embodiments.

FIG. 18 is a schematic diagram of a board layer structure of a circuit board of an optical module, in accordance with some embodiments. As shown in FIG. 18, the circuit board 300 includes a first board layer 301, a second board layer 302, a third board layer 303, and a plurality of medium layers 320. The first board layer 301, the second board layer 302, and the third board layer 303 are disposed at intervals along the thickness direction of the circuit board 300. The plurality of medium layers 320 each are disposed between every two adjacent board layers, so as to insulate the three board layers. The medium layers 320 are made of an insulating medium, for example, the medium layers 320 are made of a medium such as glass optical fiber or epoxy resin.

For example, the plurality of medium layers 320 include a first medium layer 321 and a second medium layer 322. The first medium layer 321 is disposed between the first board layer 301 and the second board layer 302, and the second medium layer 322 is disposed between the second board layer 302 and the third board layer 303.

In some embodiments, as shown in FIG. 18, the circuit board 300 further includes a blind hole 330. A position of the blind hole 330 corresponds to a position of the light-emitting driving chip 480 and passes through portions of the plurality of board layers and portions of the plurality of medium layers along the thickness direction of the circuit board 300. For example, the blind hole 330 runs through any two of the plurality of board layers along the thickness direction of the circuit board 300. The blind hole 330 is filled with a thermally conductive material (i.e., a filling member) such as metal copper, or metal aluminum, so as to improve the thermal conductivity efficiency of the circuit board 300 in the thickness direction.

For example, the light-emitting driving chip 480 is disposed on a surface of the first board layer 301 away from the second board layer 302. The blind hole 330 corresponds to the position of the light-emitting driving chip 480, is disposed at a side of the first board layer 301 proximate to the second board layer 302, and runs through the first medium layer 321, the second board layer 302, the second medium layer 322, and the third board layer 303 in sequence.

For example, the plurality of board layers of the circuit board 300 are made of metal copper, therefore, metal copper may be selected as the filling material of the blind hole 330, so as to facilitate the processing of the circuit board 300.

It can be understood that, during a process of transferring the heat generated by the light-emitting driving chip 480 to the circuit board 300, the heat may be transferred outwards (e.g., transferred to the lower shell 220) through the filling material in the blind hole 330, so that the thermal conductivity efficiency of the circuit board 300 in the thickness direction may be improved, thereby improving the heat dissipation performance of the light-emitting component 400.

In some embodiments, a portion of the blind hole 330 is recessed on a surface of the first board layer 301 facing toward the second board layer 302, so as to increase a contact area between the thermally conductive material in the blind hole 330 and the first board layer 301, which is conducive to improving the heat dissipation efficiency of the circuit board 300.

In some embodiments, as shown in FIG. 18, the circuit board 300 further includes a solder mask 309, and the solder mask 309 is located on a side of the third board layer 303 away from the first board layer 301. The solder mask 309 is configured to protect the plurality of board layers and solder pads in the plurality of board layers, so as to prevent short circuits and oxidation inside the circuit board 300.

For example, the blind hole 330 runs through the solder mask 309 and is connected with other structures (e.g., the light-emitting housing 410).

In some embodiments, the light-emitting component 400 includes a plurality of light-emitting driving chips 480, so as to increase the propagation rate of the optical signal in the light module 200.

For example, referring to FIG. 18, the light-emitting component 400 includes four light-emitting driving chips 480. In this case, the circuit board 300 includes four blind holes 330. The four blind holes 330 correspond to positions of the four light-emitting driving chips 480 and are disposed under the four light-emitting driving chips 480, so as to assist the four light-emitting driving chips 480 to dissipate heat.

FIG. 19 is a schematic diagram of a board layer structure of another circuit board of an optical module, in accordance with some embodiments. As shown in FIG. 19, the circuit board 300 includes eight board layers and a plurality of medium layers 320. The eight board layers are disposed at intervals along the thickness direction of the circuit board 300. The plurality of medium layers 320 each are respectively disposed between every two adjacent board layers in the eight board layers, so as to insulate the eight board layers. The eight board layers include a first board layer 301, a second board layer 302, a third board layer 303, a fourth board layer 304, a fifth board layer 305, a sixth board layer 306, a seventh board layer 307, and an eighth board layer 308.

It can be understood that, in the circuit board 300, in a case where the blind hole 330 runs through too many board layers (e.g., more than five board layers), it may affect the strength and rigidity of the circuit board 300, resulting in cracks between the plurality of board layers.

In this case, sub-blind holes may be disposed between different board layers and assist the circuit board 300 to dissipate heat vertically. As shown in FIG. 19, the blind hole 330 includes a first sub-blind hole 331, a second sub-blind hole 332, a third sub-blind hole 333, and a fourth sub-blind hole 334.

The first sub-blind hole 331 corresponds to the position of the light-emitting driving chip 480 and is disposed between the first board layer 301 and the second board layer 302. The first sub-blind hole 331 is filled with the thermally conductive material, so that the heat in the first board layer 301 is transferred to the second board layer 302.

The second sub-blind hole 332 is disposed between the second board layer 302 and the third board layer 303, and the second sub-blind hole 332 is filled with the thermally conductive material, so that the heat in the second board layer 302 is transferred to the third board layer 303.

The third sub-blind hole 333 is disposed between the third board layer 303 and the seventh board layer 307, and runs through the fourth board layer 304, the fifth board layer 305, and the sixth board layer 306 in sequence. The third sub-blind hole 333 is filled with the thermally conductive material, so that the heat in the third board layer 303 is transferred along a direction proximate to the seventh board layer 307.

The fourth sub-blind hole 334 is disposed between the seventh board layer 307 and the eighth board layer 308, and the fourth sub-blind hole 334 is filled with the thermally conductive material, so that the heat in the seventh board layer 307 is transferred to the eighth board layer 308.

For example, the filling material in the first sub-blind hole 331, the second sub-blind hole 332, the third sub-blind hole 333, and the fourth sub-blind hole 334 is metal copper, so as to facilitate the processing and production of the circuit board 300.

In some embodiments, orthogonal projections of the first sub-blind hole 331, the second sub-blind hole 332, the third sub-blind hole 333, and the fourth sub-blind hole 334 on the first board layer 301 may overlap, partially overlap, or not overlap with each other.

It can be understood that, in a case where the orthogonal projections of the first sub-blind hole 331, the second sub-blind hole 332, the third sub-blind hole 333, and the fourth sub-blind hole 334 on the first board layer 301 overlap with each other, it is conducive to improving the heat dissipation efficiency of the circuit board 300 in the thickness direction. In a case where the orthogonal projections of the first sub-blind hole 331, the second sub-blind hole 332, the third sub-blind hole 333, and the fourth sub-blind hole 334 on the first board layer 301 do not overlap with each other, it is conducive to improving the strength and rigidity of the circuit board 300.

The following describes the heat dissipation process of the light-emitting driving chip 480: the light-emitting driving chip 480 is connected to the first board layer 301, and the heat dissipated by the light-emitting driving chip 480 is transferred horizontally along the first board layer 301 and transferred to the second board layer 302 through the filling material in the first sub-blind hole 331. Then, the heat is transferred horizontally to the second sub-blind hole 332 along the second board layer 302 and transferred to the third board layer 303 through the filling material in the second sub-blind hole 332. Next, the heat is transferred horizontally to the third sub-blind hole 333 along the third board layer 303 and transferred toward the seventh board layer 307 through the filling material in the third sub-blind hole 333. Finally, the heat is transferred horizontally to the fourth sub-blind hole 334 along the seventh board layer 307 and transferred to the eighth board layer 308 through the filling material in the fourth sub-blind hole 334.

In this way, the heat generated by the light-emitting driving chip 480 is vertically transferred in the circuit board 300 through the plurality of sub-blind holes. During the heat transfer process, the heat is transferred along the copper material, which is conducive to improving the heat dissipation efficiency of the circuit board 300.

Figure 20:
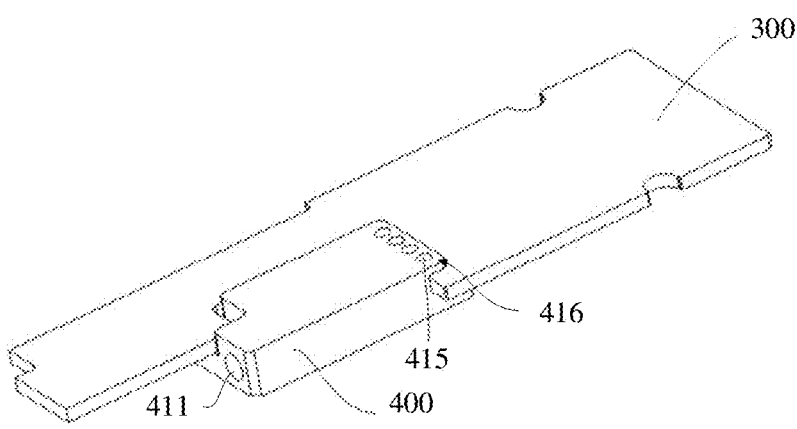
FIG. 20 is a perspective view of yet another circuit board and another light-emitting component of an optical module, in accordance with some embodiments.
Figure 21:
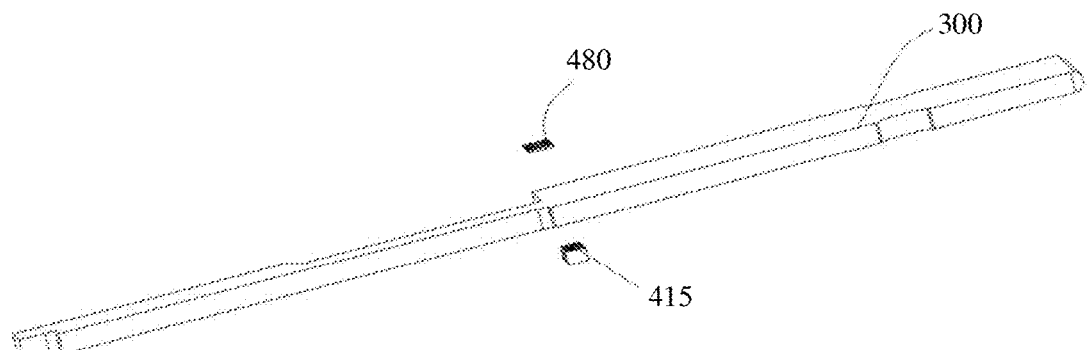
FIG. 21 is an exploded view of a light-emitting driving chip, a heat conduction column and yet another circuit board, in accordance with some embodiments.
Figure 22B:
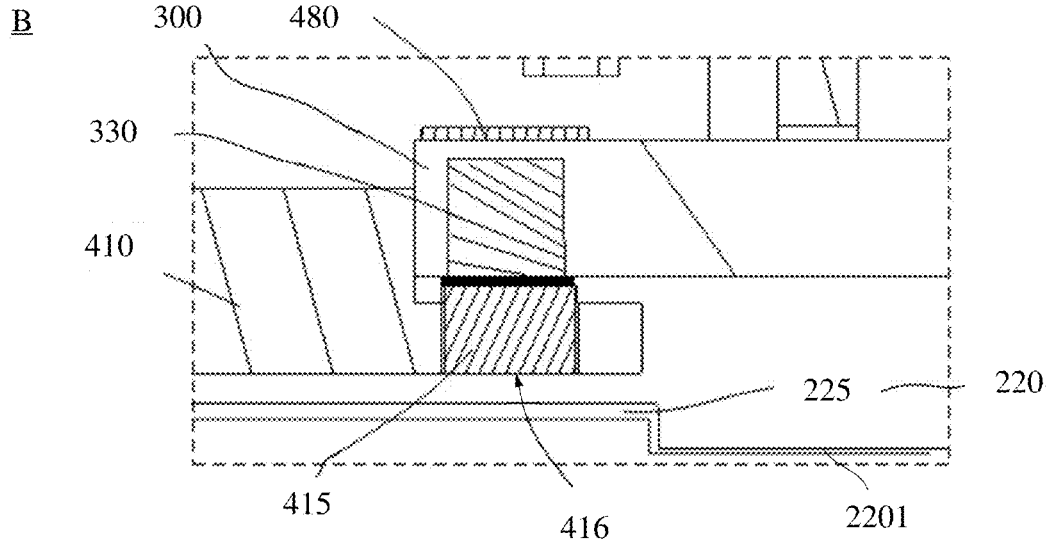
FIG. 22B is a partial enlarged view of the box B in FIG. 22A.

FIG. 20 is a perspective view of yet another circuit board and another light-emitting component of an optical module, in accordance with some embodiments; FIG. 21 is an exploded view of a light-emitting driving chip, a heat conduction column and yet another circuit board, in accordance with some embodiments; FIG. 22A is a cross-sectional view showing a partial structure of an optical module, in accordance with some embodiments; and FIG. 22B is a partial enlarged view of the box B in FIG. 22A.

In some embodiments, as shown in FIGS. 20, 21, 22A, and 22B, the light-emitting housing 410 further includes a heat conduction column 415. The heat conduction column 415 runs through the bottom wall 4101. One end of the heat conduction column 415 is in heat-conducting connection with the circuit board 300, and another end of the heat conduction column 415 is in heat-conducting connection with the lower shell 220. The heat conduction column 415 is a copper material member.

For example, the term "heat-conducting connection" refers to that the two ends of the heat conduction column 415 are respectively connected to the circuit board 300 and the lower shell 220 through heat conduction glue or heat conduction pads.

It can be understood that metal copper has a high thermal conductivity, therefore, the circuit board 300 and the lower shell 220 are connected through the heat conduction column 415, so that the heat in the circuit board 300 may be transferred to the lower shell 220, which is conducive to improving the heat dissipation efficiency of the circuit board 300 and the light-emitting driving chip 480.

In some embodiments, as shown in FIG. 22B, the one end of the heat conduction column 415 is connected to the filling material in the blind hole 330, so that the heat generated by the light-emitting driving chip 480 is conducted to the heat conduction column 415 through the filling material in the blind hole 330, which is conducive to improving the heat dissipation efficiency of the circuit board 300 and the light-emitting driving chip 480.

In some embodiments, the heat conduction column 415 may further be made of other materials with high thermal conductivity. Alternatively, the heat conduction column 415 may be configured as a structural member that facilitates heat conduction. It will be noted that, no matter what material or structure the heat conduction column 415 is made of, it is within the scope of the present disclosure as long as the heat conduction column 415 can implement the heat transfer between the circuit board 300 and the lower shell 220.

In some embodiments, as shown in FIGS. 17 and 22B, the light-emitting housing 410 further includes a heat conduction column through hole 416. The heat conduction column through hole 416 runs through the second protruding portion 414B and corresponds to the position of the blind hole 330.

The heat conduction column 415 is fixedly disposed in the heat conduction column through hole 416.

In some embodiments, as shown in FIGS. 22A and 22B, the lower shell 220 further includes a first heat conduction boss 225. The first heat conduction boss 225 is disposed on the bottom plate 2201 and protrudes toward the upper shell 210 along a thickness direction of the bottom plate 2201. The other end of the heat conduction column 415 is in heat-conducting connection with the first heat conduction boss 225 (e.g., through the heat conduction pad), so as to facilitate the heat dissipation of the heat conduction column 415 in the vertical direction.

Figure 23:
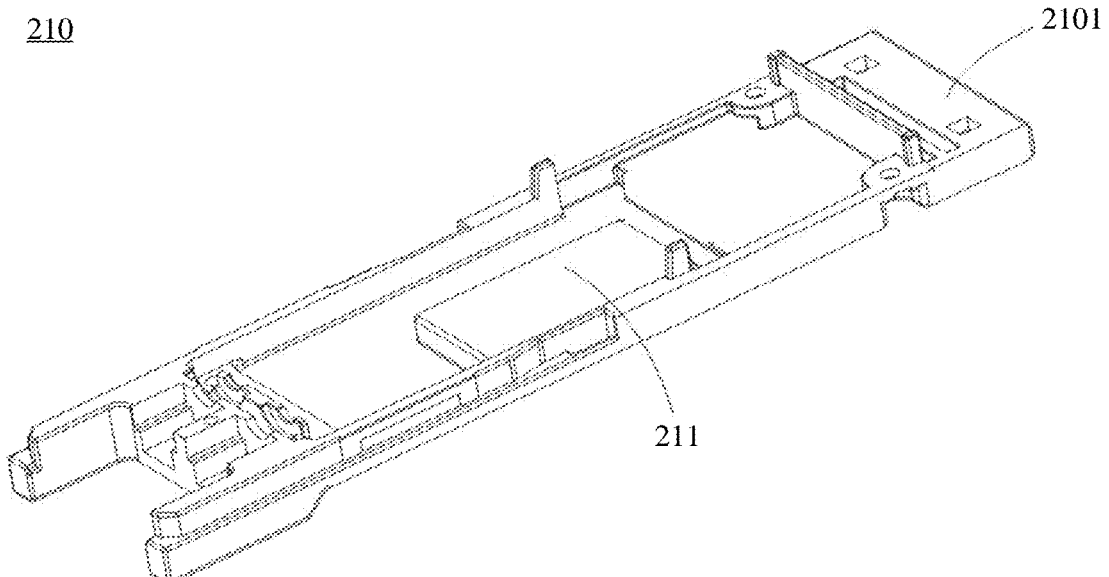
FIG. 23 is a perspective view of an upper shell of an optical module, in accordance with some embodiments.

FIG. 23 is a perspective view of an upper shell of an optical module, in accordance with some embodiments.

In some embodiments, as shown in FIG. 23, the upper shell 210 further includes a second heat conduction boss 211, the second heat conduction boss 211 is disposed on the cover plate 2101 and protrudes toward the lower shell 220 along a thickness direction of the cover plate 2101. The second heat conduction boss 211 abuts against the light-emitting cover plate 470, so that the heat in the light-emitting housing 410 may be transferred to the second heat conduction boss 211 through the light-emitting cover plate 470, so as to assist in the heat dissipation of the devices inside the light-emitting housing 410.

For example, the second heat conduction boss 211 is connected to the light-emitting cover plate 470 through the heat conduction glue.

In some embodiments, the circuit board 300 includes the eight board layers, and the position of the heat conduction column through hole 416 corresponds to a position of the fourth sub-blind hole 334. Alternatively, the position of the heat conduction column through hole 416 does not correspond to the position of the fourth sub-blind hole 334, and the heat conduction column 415 is connected to the eighth board layer 308.

In some embodiments, as shown in FIGS. 22A and 22B, the end of the heat conduction column 415 connected to the circuit board 300 protrudes from the heat conduction column through hole 416, which is conducive to improving thermal conductivity efficiency between the heat conduction column 415 and the circuit board 300.

For example, the end of the heat conduction column 415 connected to the circuit board 300 protrudes toward a direction proximate to the upper shell 210 relative to an inner bottom surface of the bottom wall 4101.

In some embodiments, as shown in FIGS. 17, 18, and 20, the light-emitting component 400 includes four light-emitting driving chips 480, and the circuit board 300 includes four blind holes 330 corresponding to the four light-emitting driving chips 480. In this case, the light-emitting housing 410 includes four heat conduction columns 415. The four heat conduction columns 415 correspond to positions of the four blind holes 330, so as to transfer the heat in the filling material in the four blind holes 330 to the lower shell 220.

In some embodiments, the filling material in the blind hole 330 is connected to the heat conduction column 415 through silver glue, so as to improve the tightness of the connection between the filling material in the blind hole 330 and the heat conduction column 415, which is conducive to improving thermal conductivity efficiency between the filling material in the blind hole 330 and the heat conduction column 415.

It can be understood that the filling material in the blind hole 330 and the heat conduction column 415 are both hard copper materials, and when the two are connected with each other, a gap will be formed. When air enters the gap, it will cause a decrease in the thermal conductivity efficiency between the filling material in the blind hole 330 and the heat conduction column 415. The silver glue is a fluid material and has good thermal conductivity, therefore, in a case where the filling material in the blind hole 330 and the heat conduction column 415 are connected with each other through the silver glue, the gap may be fully filled, which is conducive to improving thermal conductivity efficiency between the filling material in the blind hole 330 and the heat conduction column 415.

Figure 24A:
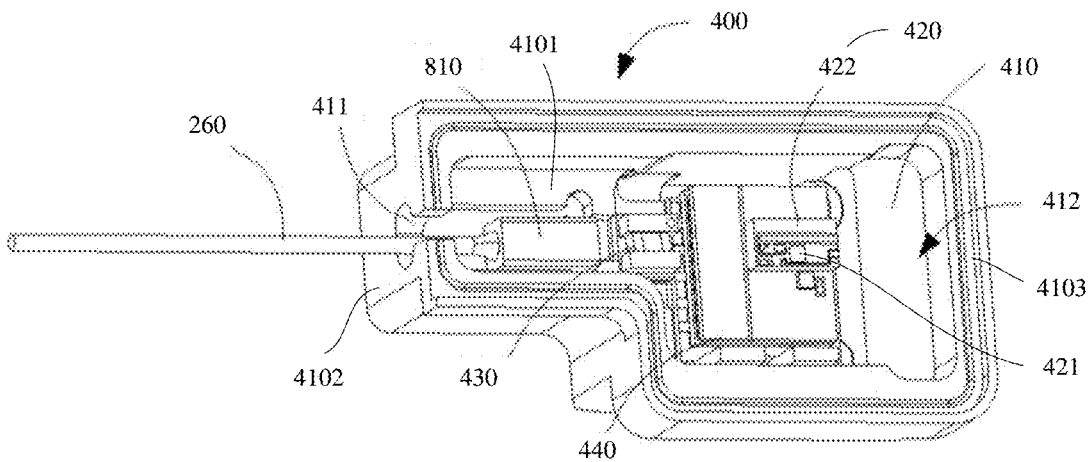
FIG. 24A is a perspective view of another light-emitting component of an optical module, in accordance with some embodiments.
Figure 24B:
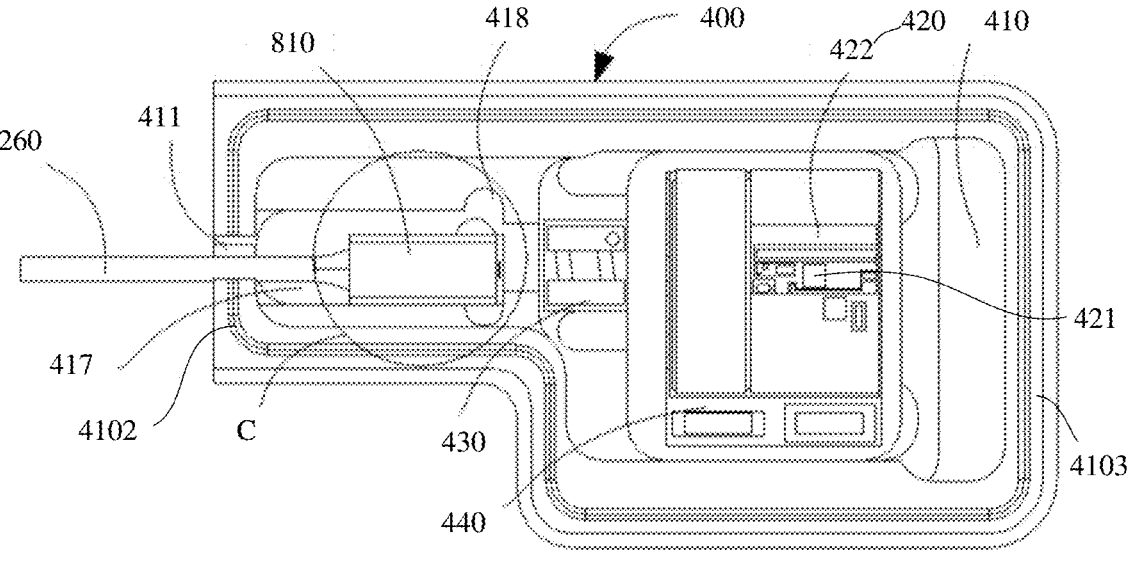
FIG. 24B is a structural diagram of another light-emitting component of an optical module, in accordance with some embodiments.

FIG. 24A is a perspective view of another light-emitting component of an optical module, in accordance with some embodiments; and FIG. 24B is a structural diagram of another light-emitting component of an optical module, in accordance with some embodiments.

In some embodiments, as shown in FIGS. 24A and 24B, the optical module 200 includes another optical fiber connection assembly 800 that is different from the optical fiber connection assembly 800 shown in FIGS. 12 to 14, and the optical fiber connection assembly 800 shown in FIGS. 24A and 24B only includes the optical fiber connector 810 but does not include the optical fiber ferrule 820. In this case, the optical fiber connector 810 is disposed in the light-emitting housing 410. The another end (the end away from the first optical fiber adapter 600) of the first internal optical fiber 260 is inserted into the light-emitting housing 410 through the through hole 411, and then inserted into the optical fiber connector 810, so as to establish the optical connection with the light-emitting component 400.

For example, the optical fiber connector 810 wraps the end portion of the first internal optical fiber 260, so that the end portion of the first internal optical fiber 260 relative to the light-emitting housing 410 may be fixed.

In some embodiments, the optical fiber connector 810 is made of a transparent and hard material that can be processed with high precision. For example, the optical fiber connector 810 is a transparent material member (e.g., a transparent plastic member, or a glass member). It can be understood that the transparent plastic and glass are easy to process, which facilitates the manufacturing of the optical fiber connector 810 and facilitates high-precision positioning of the first internal optical fiber 260.

In some embodiments, the optical fiber connector 810 is substantially cylindrical. An orthogonal projection of an axis of the first internal optical fiber 260 on a reference plane is substantially coincident with an orthogonal projection of an axis of the optical fiber ferrule 820 on the reference plane. The axis of the end portion of the first internal optical fiber 260 inserted into the optical fiber connector 810 is substantially coincided with the axis of the optical fiber connector 810, or the axis of the end portion of the first internal optical fiber 260 inserted into the optical fiber connector 810 is located above or below the axis of the optical fiber connector 810.

In some embodiments, as shown in FIGS. 24A and 24B, the optical fiber connector 810 is fixed on the bottom wall 4101, and a side of the optical fiber connector 810 facing toward the bottom wall 4101 is configured as a flat surface, so as to facilitate the fixing of the optical fiber connector 810. The light-emitting housing 410 further includes a supporting surface 417. A portion of the inner bottom surface of the bottom wall 4101 is configured as the supporting surface 417. The flat surface of the optical fiber connector 810 is matched with the supporting surface 417 and is fixedly connected with the supporting surface 417.

For example, the supporting surface 417 is connected to a portion of an inner wall of the through hole 411. The flat surface of the optical fiber connector 810 is bonded to the supporting surface 417 by means of glue.

In some embodiments, the first internal optical fiber 260 is made of a transparent material, and light transmittance of the first internal optical fiber 260 is different from light transmittance of the optical fiber connector 810. For example, the light transmittance of the first internal optical fiber 260 is lower than the light transmittance of the optical fiber connector 810, and the present disclosure is not limited thereto.

It can be understood that, both the optical fiber connector 810 and the first internal optical fiber 260 are made of transparent materials, and the light transmittance of the first internal optical fiber 260 is lower than the light transmittance of the optical fiber connector 810. Therefore, a shadow of the optical fiber connector 810 and a shadow of the end portion of the first internal optical fiber 260 may be obtained on the bottom wall 4101 by lighting from directly above the optical fiber connector 810 toward directly below, and the shadow of the end portion of the first internal optical fiber 260 is deeper than (e.g., more clearly) the shadow of the optical fiber connector 810. In this way, a centerline of the shadow of the end portion of the first internal optical fiber 260 can be obtained through two sides of the shadow, the centerline is an orthogonal projection of the axis of the end portion of the first internal optical fiber 260 on the bottom wall 4101.

The light-emitting assembly 420 may be positioned and disposed through the centerline, so that the optical signal emitted by the light-emitting assembly 420 is directly converged into the end surface of the first internal optical fiber 260 by the lens 450, thereby improving the precision of optical coupling between the first internal optical fiber 260 and the light-emitting component 420.

For example, the optical signal emitted by the light-emitting assembly 420 is transmitted to the end portion of the first internal optical fiber 260 through the light incident end surface 830 of the optical fiber connector 810 after passing through the optical devices (e.g., the lens and the isolator) in the light-emitting housing 410, and then enter the first internal optical fiber 260. Therefore, by positioning the end portion of the first internal optical fiber 260, and then adjusting the light-emitting angle of the light-emitting assembly 420, the optical axis of the light-emitting assembly 420 is substantially coincided with the axis of the end portion of the first internal optical fiber 260, which is conducive to reducing the difficulty of assembling the light-emitting component 400, and improving the precision of optical coupling between the first internal optical fiber 260 and the light-emitting component 420.

In some embodiments of the present disclosure, the end portion of the first internal optical fiber 260 is fixed relative to the light-emitting housing 410 by fixing the optical fiber connector 810 on the supporting surface 417, and then the position of the axis of the first internal optical fiber 260 is obtained by the shadow of the first internal optical fiber 260 formed on the bottom wall 4101. The position and the light-emitting angle of the light-emitting assembly 420 is adjusted according to the position of the axis, so that the optical axis of the light-emitting assembly 420 is substantially coincided with the axis of the end portion of the first internal optical fiber 260.

Figure 25:
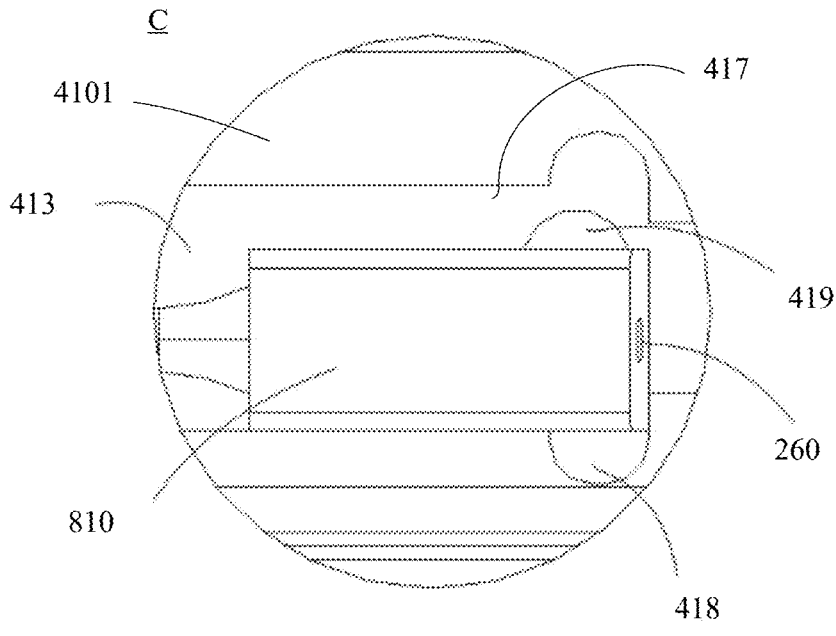
FIG. 25 is a partial enlarged view of the circle C in FIG. 24B.
Figure 26:
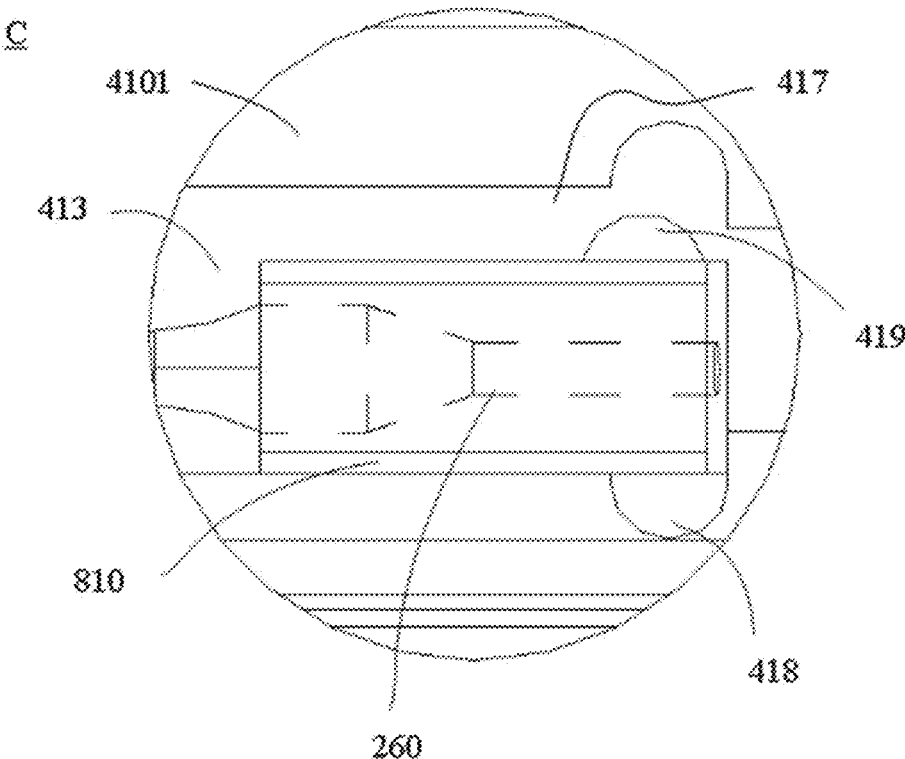
FIG. 26 is another partial enlarged view of the circle C in FIG. 24B, showing outline of a first internal optical fiber.
Figure 27:
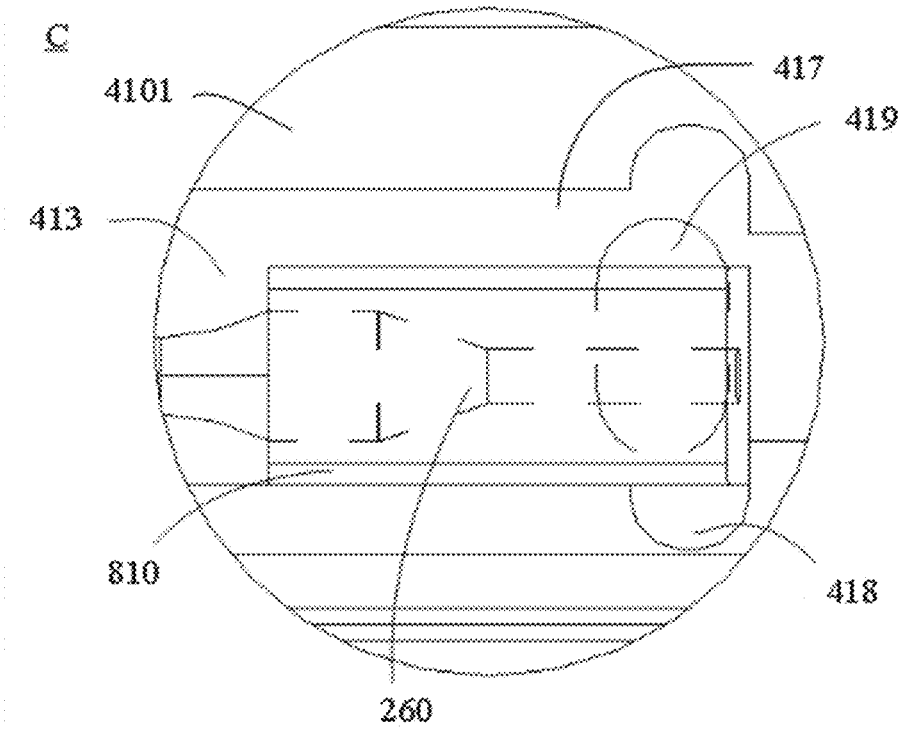
FIG. 27 is yet another partial enlarged view of the circle C in FIG. 24B, showing outline of a first internal optical fiber and a concave groove.
Figure 28:
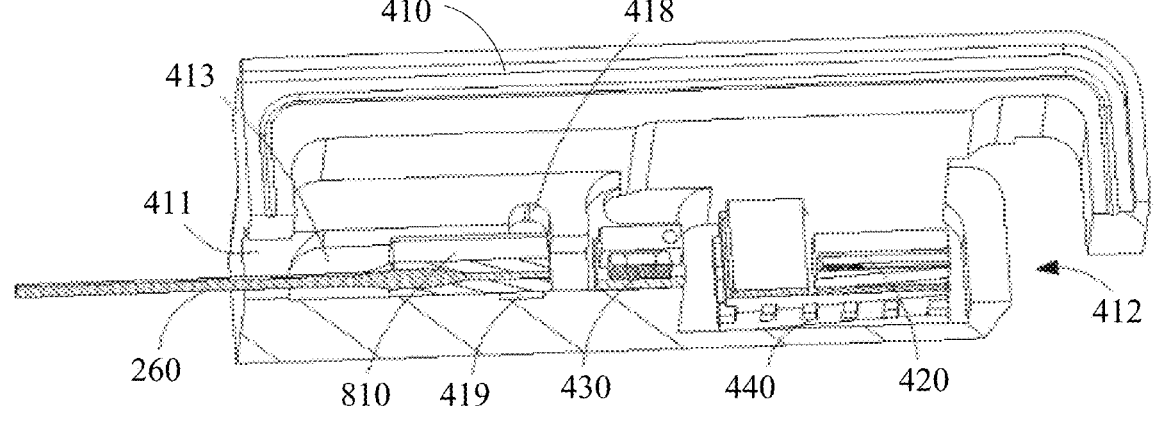
FIG. 28 is a sectional view of another light-emitting component of an optical module, in accordance with some embodiments.
Figure 29:
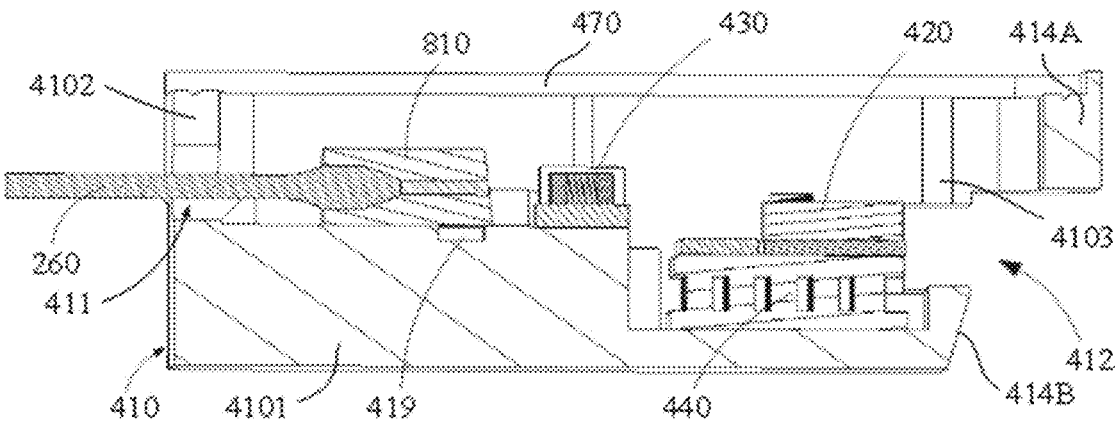
FIG. 29 is a cross-sectional view of another light-emitting component of an optical module, in accordance with some embodiments.

FIG. 25 is a partial enlarged view of the circle C in FIG. 24B, FIG. 26 is another partial enlarged view of the circle C in FIG. 24B, showing outline of a first internal optical fiber; FIG. 27 is yet another partial enlarged view of the circle C in FIG. 24B, showing outline of a first internal optical fiber and a concave groove; FIG. 28 is a sectional view of another light-emitting component of an optical module, in accordance with some embodiments; and FIG. 29 is a cross-sectional view of another light-emitting component of an optical module, in accordance with some embodiments.

As shown in FIGS. 25 to 29, the light-emitting housing 410 further includes a concave groove 419. The concave groove 419 is disposed on the supporting surface 417 and is recessed downward relative to the supporting surface 417. The optical fiber connector 810 is disposed above the concave groove 419, and an orthogonal projection of the end portion of the first internal optical fiber 260 on the supporting surface 417 is located in the concave groove 419.

In this way, since the light transmittance of the first internal optical fiber 260 is lower than the light transmittance of the optical fiber connector 810, and the optical fiber connector 810 is spaced apart from a groove bottom of the concave groove 419 by a certain distance, after the optical fiber connector 810 is installed on the supporting surface 417, the shadow of the end portion of the first internal optical fiber 260 may be clearly obtained on the groove bottom of the concave groove 419 by lighting to the top of the optical fiber connector 810. In this way, the centerline of the two sides can be obtained through the two sides of the shadow, and the centerline is also the orthogonal projection of the axis of the first internal optical fiber 260 on the groove bottom of the concave groove 419. The light-emitting assembly 420 may be positioned and disposed through the centerline, so that the optical signal emitted by the light-emitting assembly 420 is directly converged into the end surface of the first internal optical fiber 260 by the lens 450, thereby further reducing the tolerance between the optical axis of the light-emitting component 420 and the axis of the end portion of the first internal optical fiber 260, improving the precision of optical coupling between the first internal optical fiber 260 and the light-emitting component 420, and improving a direct transmission rate of the optical signal emitted by the light-emitting assembly 420 to the first internal optical fiber 260.

It can be understood that, in any of the above-mentioned embodiments, the optical fiber connector 810 is attached to the supporting surface 417, therefore, it is difficult to observe or discern the shadow of the first internal optical fiber 260 by lighting from directly above the optical fiber connector 810 toward directly below. In this case, if the position of the axis of the first internal optical fiber 260 is determined according to an unclear shadow of the first internal optical fiber 260, it is possible to increase the tolerance between the light-emitting optical axis of the light-emitting component 420 and the axis of the end portion of the first internal optical fiber 260, thereby reducing the precision of optical coupling between the first internal optical fiber 260 and the light-emitting assembly 420.

Therefore, in some embodiments of the present disclosure, the optical module 200 is provided with the concave groove 419 on the supporting surface 417. In this way, the shadow of the end portion of the first internal optical fiber 260 may be clearly obtained on the groove bottom of the concave groove 419 by lighting to the top of the optical fiber connector 810, and the position of the axis of the first internal optical fiber 260 may be determined according to the shadow.

In some embodiments, as shown in FIGS. 24B to 28, the light-emitting housing 410 further includes an avoidance groove 418. The avoidance groove 418 is disposed on a side of the supporting surface 417 away from the through hole 411, and the avoidance groove 418 is communicated with the concave groove 419. For example, the bottom of the avoidance groove 418 is flush with the supporting surface 417, and a side of the avoidance groove 418 facing toward the supporting surface 417 is open. An end surface of the optical fiber connector 810 away from the through hole 411 abuts against a side wall of the avoidance groove 418 away from the through hole 411.

It can be understood that the avoidance groove 418 disposed in the light-emitting housing 410 facilitates the processing of the concave groove 419 and may perform preliminary positioning of the optical fiber connector 810. In addition, when assembling the optical fiber connector 810, it is necessary to use the clamping tool to clamp the end of the optical fiber connector 810 to the position of the avoidance groove 418. In this case, the avoidance groove 418 may avoid the clamping tool, so as to facilitate the assembly of the optical fiber connector 810.

In some embodiments, as shown in FIG. 29, the end surface of the first internal optical fiber 260 located in the optical fiber connector 810 is inclined relative to the bottom wall 4101. It can be understood that, when the optical signal is incident on the end surface of the first internal optical fiber 260, a part of the optical signal will enter the first internal optical fiber 260 through the end surface, and another part of the optical signal will be reflected at the end surface. Therefore, by setting the end surface of the first internal optical fiber 260 to be inclined relative to the bottom wall 4101, the another part of the optical signal will not return to the light-emitting assembly 420 along the incident direction when reflected at the end surface of the first internal optical fiber 260.

A person skilled in the art will understand that the scope of disclosure in the present disclosure is not limited to specific embodiments discussed above and may modify and substitute some elements of the embodiments without departing from the spirits of this application. The scope of the application is limited by the appended claims.

What is claimed is:

1. An optical module, comprising:
   a shell;
   a circuit board disposed in the shell;
   a light-emitting component disposed in the shell, the light-emitting component being electrically connected with the circuit board and configured to generate an optical signal;
   a first optical fiber adapter;
   a first internal optical fiber, an end of the first internal optical fiber being connected to the first optical fiber adapter;
   an optical fiber connector optically connected to the light-emitting component and wrapping another end of the first internal optical fiber; and
   an optical fiber ferrule, wherein the optical fiber ferrule is disposed in the optical fiber connector and wraps the another end of the first internal optical fiber; the optical fiber ferrule is a transparent material member; and an end surface of the another end of the first internal optical fiber is inclined relative to the bottom wall;
   wherein the first internal optical fiber and the optical fiber connector are transparent material members, and light transmittance of the first internal optical fiber is different from light transmittance of the optical fiber connector;
   wherein the light-emitting component includes a light-emitting housing, and the light-emitting housing includes a bottom wall and a concave groove; the concave groove is disposed on the bottom wall, and is recessed downward relative to the bottom wall; the optical fiber connector is disposed on the bottom wall, and a portion of the optical fiber connector is located above the concave groove; and an orthogonal projection of the another end of the first internal optical fiber on the bottom wall is located within the concave groove;

the light-emitting housing further including:

a first side wall being a side wall of the light-emitting housing proximate to the first optical fiber adapter;

a through hole disposed in the first side wall; and an assembling groove disposed on the bottom wall and communicated with the through hole; the assembling groove including a limiting wall, and the limiting wall being a side wall of the assembling groove away from the through hole; and the optical fiber connector being disposed in the assembling groove through the through hole;

the light-emitting component further including:

a light-emitting assembly disposed in the light-emitting housing and configured to emit the optical signal; and a lens disposed in the light-emitting housing and located on a light-emitting path of the light-emitting assembly; the lens being configured to converge the optical signal emitted by the light-emitting assembly, and wherein a portion of an end of the optical fiber ferrule abuts against the limiting wall, so that the end of the optical fiber ferrule is located on the light-emitting path of the lens, and the optical signal converged by the lens enters the another end of the first internal optical fiber.

2. The optical module according to claim 1, wherein the another end of the first internal optical fiber is connected to the optical fiber connector through the through hole; and the light-emitting housing further includes:

a supporting surface, a portion of an inner bottom surface of the bottom wall being configured as the supporting surface, the concave groove being disposed on the supporting surface, and the optical fiber connector is disposed on the supporting surface.

3. The optical module according to claim 2, wherein the light-emitting housing further includes an avoidance groove, the avoidance groove is disposed on a side of the supporting surface away from the through hole, and a side of the avoidance groove proximate to the supporting surface is open.

4. The optical module according to claim 1, wherein the light-emitting component further includes:

a thermo electric cooler disposed on an inner bottom surface of the bottom wall and configured to support the light-emitting assembly; and an isolator located on an optical path between the lens and the optical fiber connector and configured to transmit an optical signal from the lens and reflect an optical signal from the optical fiber connector.

5. The optical module according to claim 1, further comprising a second optical fiber adapter;

the shell including a lower shell, the lower shell including a bottom plate and a first adapter fixing seat, the first adapter fixing seat being disposed on the bottom plate and including:

a first installation groove group, a portion of the first optical fiber adapter being disposed in the first installation groove group, so as to limit the first optical fiber adapter to move in an axial direction of the first optical fiber adapter; and a second installation groove group, a portion of the second optical fiber adapter is disposed in the second installation groove group, so as to limit the second optical fiber adapter to move in an axial direction of the second optical fiber adapter.

6. The optical module according to claim 5, wherein any one of the first installation groove group and the second installation groove group includes:

a first limiting groove;

a first supporting groove disposed at a side of the first limiting groove along the axial direction of the first optical fiber adapter; and a second supporting groove disposed at another side of the first limiting groove along the axial direction of the first optical fiber adapter;

any one of the first optical fiber adapter and the second optical fiber adapter includes:

an adapter body disposed in the first supporting groove and the second supporting groove; and a protrusion disposed on an outer circumferential surface of the adapter body and extending along a circumferential direction of the adapter body; the protrusion being disposed in the first limiting groove, so as to limit any one of the first optical fiber adapter and the second optical fiber adapter to move in the axial direction.

7. The optical module according to claim 6, wherein any one of the first optical fiber adapter and the second optical fiber adapter further includes a positioning mechanism, the positioning mechanism is disposed on the protrusion, and is configured to cooperate with the first limiting groove, so as to limit any one of the first optical fiber adapter and the second optical fiber adapter to rotate in a circumferential direction;

wherein the positioning mechanism includes at least one positioning surface; in a case where the at least one positioning surface includes a plurality of positioning surfaces, the plurality of positioning surfaces include a first positioning surface and a second positioning surface, and the first positioning surface is inclined relative to the second positioning surface.

8. The optical module according to claim 6, wherein the first adapter fixing seat further includes a second limiting groove, the second limiting groove satisfies one of the following: the second limiting groove is disposed between the first supporting groove and the first limiting groove, and the second limiting groove is disposed between the second supporting groove and the first limiting groove;

the optical module further comprises a sealing member, the sealing member is sleeved on an outer circumference of the first optical fiber adapter and an outer circumference of the second optical fiber adapter, and the sealing member is disposed in the second limiting groove.

9. The optical module according to claim 1, wherein the circuit board includes:

a circuit board body; and a mounting hole disposed in the circuit board body, and the light-emitting housing being disposed in the mounting hole;

the light-emitting housing further includes:

a second side wall disposed opposite to the first side wall; and an opening disposed in the second side wall, and a portion of the circuit board being connected with the light-emitting housing through the opening.

10. The optical module according to claim 1, further comprising:

a light-receiving component;

a second optical fiber adapter; and a second internal optical fiber, an end of the second internal optical fiber being connected to the second optical fiber adapter, and another end of the second internal optical fiber being connected to the light-receiving component;

wherein the light-receiving component includes:

an arrayed waveguide grating, an input terminal of the arrayed waveguide grating being connected to the another end of the second internal optical fiber;

a light-receiving chip, an output terminal of the arrayed waveguide grating covering the light-receiving chip; and a transimpedance amplifier, the light-receiving chip and the transimpedance amplifier being disposed on a surface of the circuit board, and the transimpedance amplifier being located on a side of the light-receiving chip.

11. The optical module according to claim 1, wherein the shell includes;

an upper shell; and a lower shell, the upper shell being covered with the lower shell, so as to define an installation cavity between the upper shell and the lower shell; and the circuit board and the light-emitting component being disposed in the installation cavity;

wherein the light-emitting housing further includes:

a second side wall disposed opposite to the second side wall, and the first side wall being closer to the first optical fiber adapter than the second side wall;

an opening disposed in the second side wall, a portion of the circuit board being inserted into the light-emitting housing through the opening;

a light-emitting driving chip disposed on the portion of the circuit board; and a heat conduction column disposed in the light-emitting housing, an end of the heat conduction column being connected to the circuit board, and another end of the heat conduction column being connected to the lower shell.

12. The optical module according to claim 11, wherein the heat conduction column is connected with the circuit board through silver glue; and the heat conduction column is connected with the lower shell through heat conduction glue.

13. The optical module according to claim 11, wherein the end of the heat conduction column protrudes toward a direction proximate to the upper shell relative to an inner bottom surface of the bottom wall.

14. The optical module according to claim 11, wherein the light-emitting housing further includes a first protruding portion and a second protruding portion; the first protruding portion and the second protruding portion are connected to the second side wall, and protrude toward a direction away from the first side wall; and the first protruding portion and the second protruding portion are respectively located on two sides of the opening, and the first protruding portion is further away from the lower shell than the second protruding portion;

wherein the heat conduction column is disposed in the second protruding portion.

15. The optical module according to claim 14, wherein an end surface of the first protruding portion away from the second side wall is further away from the second side wall than an end surface of the second protruding portion away from the second side wall.

16. The optical module according to claim 11, wherein the lower shell includes a first heat conduction boss, and the first heat conduction boss protrudes toward a direction proximate to the upper shell; and the another end of the heat conduction column is connected to the first heat conduction boss.

17. The optical module according to claim 11, wherein the light-emitting component further includes a light-emitting cover plate, and the light-emitting cover plate covers the light-emitting housing;

the upper shell includes a second heat conduction boss, the second heat conduction boss is located at a side of the light-emitting cover plate away from the light-emitting housing, and the second heat conduction boss is connected with the light-emitting cover plate through heat conduction glue.

18. The optical module according to claim 11, wherein the circuit board includes:

a plurality of board layers disposed at intervals along a thickness direction of the circuit board;

a blind hole; and a filling member filled in the blind hole and connecting any two of the plurality of board layers with each other.

19. The optical module according to claim 18, wherein along the thickness direction of the circuit board, positions of the blind hole, the heat conduction column, and the light-emitting driving chip correspond to each other.

* * * * *